United States Patent [19]

Kou et al.

[11] Patent Number: 5,640,078
[45] Date of Patent: Jun. 17, 1997

[54] METHOD AND APPARATUS FOR AUTOMATICALLY SWITCHING AND CHARGING MULTIPLE BATTERIES

[75] Inventors: Abraham H. Kou, Redmond; Robert A. Wiley, Tukwila, both of Wash.

[73] Assignee: Physio-Control Corporation, Redmond, Wash.

[21] Appl. No.: 188,240

[22] Filed: Jan. 26, 1994

[51] Int. Cl.[6] .............................. H02J 7/00; H01M 10/44
[52] U.S. Cl. .................................. 320/15; 320/2; 320/5
[58] Field of Search ............................ 320/15–19, 2, 320/5–14

[56] References Cited

U.S. PATENT DOCUMENTS

| | | | |
|---|---|---|---|
| 3,789,854 | 2/1974 | Lee | 607/17 |
| 4,081,738 | 3/1978 | Roller | 320/16 |
| 5,028,859 | 7/1991 | Johnson et al. | 320/15 |
| 5,057,762 | 10/1991 | Goedken et al. | 320/15 |
| 5,121,046 | 6/1992 | McCullough | 320/7 X |
| 5,122,722 | 6/1992 | Goedken et al. | 320/22 |
| 5,148,042 | 9/1992 | Nakazoe | 307/65 |
| 5,264,777 | 11/1993 | Smead | 320/6 |
| 5,270,946 | 12/1993 | Shibasaki et al. | 364/492 |
| 5,355,071 | 10/1994 | Ishida et al. | 320/6 |
| 5,422,558 | 6/1995 | Stewart | 320/5 X |
| 5,477,123 | 12/1995 | Allen et al. | 320/17 X |
| 5,485,073 | 1/1996 | Kasashima et al. | 320/15 |

FOREIGN PATENT DOCUMENTS

| | | | |
|---|---|---|---|
| 0420645 | 4/1991 | European Pat. Off. | G06F 1/26 |
| 0463593 | 1/1992 | European Pat. Off. | G06F 1/26 |
| 39 26 655 | 7/1990 | Germany | H02J 7/04 |
| 2242794 | 10/1991 | United Kingdom | H02J 7/00 |
| WO90/15466 | 12/1990 | WIPO | H02J 7/00 |

*Primary Examiner*—Peter S. Wong
*Assistant Examiner*—K. Shin
*Attorney, Agent, or Firm*—Christensen O'Connor Johnson & Kindness PLLC

[57] ABSTRACT

A battery selecting and charging system forms part of a portable electronic device, preferably a portable medical device. When the device is powered up, a selecting circuit selects one of two rechargeable batteries to power the device until it is depleted, and then automatically switches to the other battery. When the second battery is depleted, both batteries are selected to power the device. When the device is powered down, a battery charging circuit, having both a high and low charge section, provides a high charge to the battery having the greatest terminal voltage. Thereafter, the high charge is applied to the other battery, the low charge is applied to the first battery, and then the low charge is applied to the second battery. The battery charging circuit monitors the terminal voltage to prevent any damage to the batteries or the device.

12 Claims, 13 Drawing Sheets

METHOD AND APPARATUS FOR AUTOMATICALLY SWITCHING AND CHARGING MULTIPLE BATTERIES

TECHNICAL FIELD

The present invention relates to methods and apparatus for switching multiple batteries to power electronic devices and to methods and apparatus for recharging multiple batteries.

BACKGROUND OF THE INVENTION

Most portable electrical devices use batteries to supply power to the device. When a charge in the battery is depleted, the battery must be replaced. With most electrical devices, battery replacement is not problematic. With emergency electrical devices, however, the time required to replace a battery can at times be unacceptable. For example, emergency medical devices such as portable defibrillators use one battery as the power source. When the battery is depleted, the operator must manually remove the battery and install a fresh one. In a clinical setting, this manual method of exchanging batteries may result in delay of critically needed medical treatment. Additionally, if a replacement battery is unavailable, the emergency electrical device may fail of its essential purpose.

Some emergency electrical devices use two or more batteries. A manually actuatable switch allows the operator to switch from a depleted battery to a fresh one. This manual method can delay critically needed medical treatment. Diodes or other hardware devices have been used to automatically select the battery with a greater charge to power the electrical device. After the battery with the greater charge is partially depleted, the second battery then has a greater charge and is used to power the electrical device. This process of swapping between batteries as they alternatively obtain a greater charge than the other continues until both batteries are depleted. Half depleted batteries are not as reliable as more fully charged batteries. By slowly draining both batteries, the electrical device therefore becomes less reliable. Additionally, if one of the two partially drained batteries fails, the other battery may quickly be depleted, requiring the operator to replace new batteries into the system. The reason for providing two or more batteries to avoid replacement during critical times is defeated. The operator must also remember to constantly carry additional fresh batteries.

Most portable electrical devices use a rechargeable battery to power the device. When a charge in the battery is depleted, the battery is removed from the device and connected to a charging circuit which recharges the battery by pumping current into the battery. Some rechargeable batteries are damaged when they are frequently recharged or they are recharged when they are not depleted. Consequently, an operator of the device could possibly wait until the battery is fully depleted before recharging it. With emergency electronic devices, this practice is often unacceptable because the operator may need to replace the battery during a critical period.

Some emergency electronic devices have a battery status indicator to notify the operator of the battery's status. The drain on a battery can vary greatly from moment to moment while the device is actively being used. The operator, therefore, must frequently monitor the status of the batteries and again carry additional fully charged batteries at all times. Furthermore, battery status may change erratically while the device is actively being used. Consequently, any indication of the batteries' status could be erroneous.

Rechargeable batteries lose their charge faster after being recharged as compared to nonrechargeable batteries. Consequently, the batteries should be used soon after being recharged. The operator must insure that any spare batteries he or she carries are not old. During an emergency situation, the operator may forget to carry freshly charged batteries or forget to bring additional batteries altogether. The operator may also forget to recharge the batteries after an emergency. As a result, the next time the emergency electronic device must be used, the batteries may not be fully charged and therefore may run out of power during a critical period. Furthermore, rechargeable batteries require the operator to diligently recharge the battery when it is depleted. The above host of problems inherent in rechargeable batteries can result in an unreliable electronic device or result in delays, both being unacceptable for emergency electrical devices.

It often requires over 12 hours to fully recharge a rechargeable battery. Operators generally would prefer a faster battery charging circuit. Such circuits have been developed which provide high and low charges to a battery. The high charge is first applied to the battery to recharge the battery up to 80% of its capacity. Thereafter, the low charge is applied to the battery to fully charge it. Some of these high/low chargers accept more than one battery and subject all batteries to the high charge, and then to the low charge. The operator must wait until all the batteries placed in the charging device are recharged before connecting them back to the electronic device. Therefore, when these chargers are used in conjunction with emergency electronic devices, many batteries must be purchased and recharged so that, in addition to the batteries in the device, some fully charged batteries are on hand in the event of an emergency, while other batteries are being recharged. The additional batteries are an added expense.

Overall, the inventors are unaware of a reliable portable electronic device using two or more rechargeable batteries which provide continuous power to the device, without any delays, and which charges the batteries without relying on the operator's memory or diligence in carrying additional batteries or recharging depleted ones.

SUMMARY OF THE INVENTION

According to principles of the present invention, a portable electronic unit includes a battery selecting and charging system which automatically selects one of multiple batteries to power the system and which appropriately charges the multiple batteries without damage to the batteries or the unit. The present invention is suited for use in emergency medical devices such as defibrillators. Since an operator may not predict when these devices are to be used, they generally must be in full operation (i.e., with fully charged batteries) at all times. Consequently, the battery selecting/charging system of the present invention preferably uses two batteries, a battery A and a battery B. When the unit is powered up, a selecting circuit selects battery A if it is installed and uses this battery to power the unit until it is depleted. Thereafter, the circuit selects battery B to power the unit. By always selecting battery A first, the system is more reliable in that the second battery, battery B, remains in reserve until needed.

When the unit is powered down and coupled to an external power source, the batteries A and B are recharged. A recharging circuit in the unit uses a two-step recharging method whereby a high charge is applied to both batteries to provide as much charge to the batteries in the shortest amount of time before a second low charge circuit is used to fully charge the batteries. Due to power constraints in the preferred embodiment, only one battery may generally be charged at a time. Therefore, the system supplies the high charge to the battery having the greatest amount of charge before applying the high charge to the other battery. By recharging the battery already having the greatest amount of charge, this battery is almost fully charged, and is thus more reliable.

The present invention greatly enhances the reliability of the power supply for the defibrillator by allowing the defibrillator to draw power from any or all the batteries installed therein. A microprocessor monitors the status of the batteries and automatically determines which battery shall be connected to the electronic apparatus. In the event the battery being used is becoming depleted, the microprocessor will switch over to another battery without interrupting functioning of the defibrillator. The battery charging circuit resident inside the defibrillator is also controlled by the microprocessor. The battery charging circuit charges the batteries as needed whenever an external voltage source is connected thereto. The microprocessor monitors the voltage on the batteries and disconnects the charging circuit from any battery which is fully charged, or which is determined to be internally defective. The batteries are preferably received by slots within the defibrillator. The microprocessor also monitors whether a battery has been inserted into one of these slots so as not to connect the charging circuit to an empty battery slot. The battery charger greatly reduces the routine maintenance required to keep the defibrillator in full operation at all times, requiring the operator to only connect the external voltage source thereto.

In a broad sense, the present invention embodies a battery charging and selecting system coupled to a terminal of a voltage supply for charging at least first and second batteries and for selecting one of at least first and second batteries to deliver power to an electrical component. The system includes a battery charger, a battery selector, a battery voltage monitoring circuit, and a control circuit. The battery charger is coupled to the terminal of the voltage supply and selectively coupled to the first and second batteries, the battery charger selectively providing a first amount of current to the first and second batteries. The battery selector selectively couples the first and second batteries to the electrical component, the selector having a first state that couples at least one of the first and second batteries to the electrical component to supply power thereto, and a second state that uncouples both the first and second batteries from the electrical component. The battery voltage monitoring circuit is coupled to the first and second batteries and outputs first and second voltage signals corresponding to first and second voltages therefrom, all respectively.

The control circuit is coupled to the battery charger, the battery selector and the battery voltage monitoring circuit. If the battery selector is in the first state, the control circuit (i) directs the battery selector to couple the first battery to the electrical component, (ii) compares the first voltage signal to a threshold value, and (iii) directs the battery selector to couple the second battery to the electrical component when the first voltage signal is lower than the threshold voltage value. If the battery selector is in the second state, the control circuit (i) compares the first and second voltage signals, (ii) determines that the first battery has a greater voltage than the second battery, (iii) directs the battery charger to provide the first amount of current to the first battery, and (iv) thereafter directs the battery charger to provide the first amount of current to the second battery.

The battery charger preferably includes a first charging circuit providing the first amount of current and a second charging circuit providing a second amount of current, the second amount of current being less than the first amount of current. The control circuit (v) causes the second charging circuit to provide the second amount of current to the first battery, and (vi) thereafter causes the second charging circuit to provide the second amount of current to the second battery.

The control circuit also preferably compares the second voltage signal output from the battery voltage monitoring circuit to a threshold value when the battery selector is in the first state. The control circuit then directs the battery selector to couple both the first and second batteries to the electrical component when the second voltage signal is lower than the threshold value.

The present invention solves problems inherent in the prior art by providing both a battery selecting circuit and a battery charging circuit in a portable electronic device. When the device is powered up, the present invention selects one battery to power the device until it is depleted and then automatically switches to a second battery. When the device is powered down and connected to an external power source, the device automatically and quickly recharges the batteries up to their full capacity, without damaging them. The recharging circuit provides the greatest amount of charge in the shortest period of time to attempt to provide at least one nearly fully charged battery for the device in as short a period of time as possible. The operator of the device need not carry additional batteries if the device has been provided a minimal amount of time to recharge. Other features and advantages of the present invention will become apparent from studying the following detailed description of the presently preferred embodiment, together with the following drawings.

DETAILED DESCRIPTION OF THE PRESENTLY PREFERRED EMBODIMENT

Figure 1:
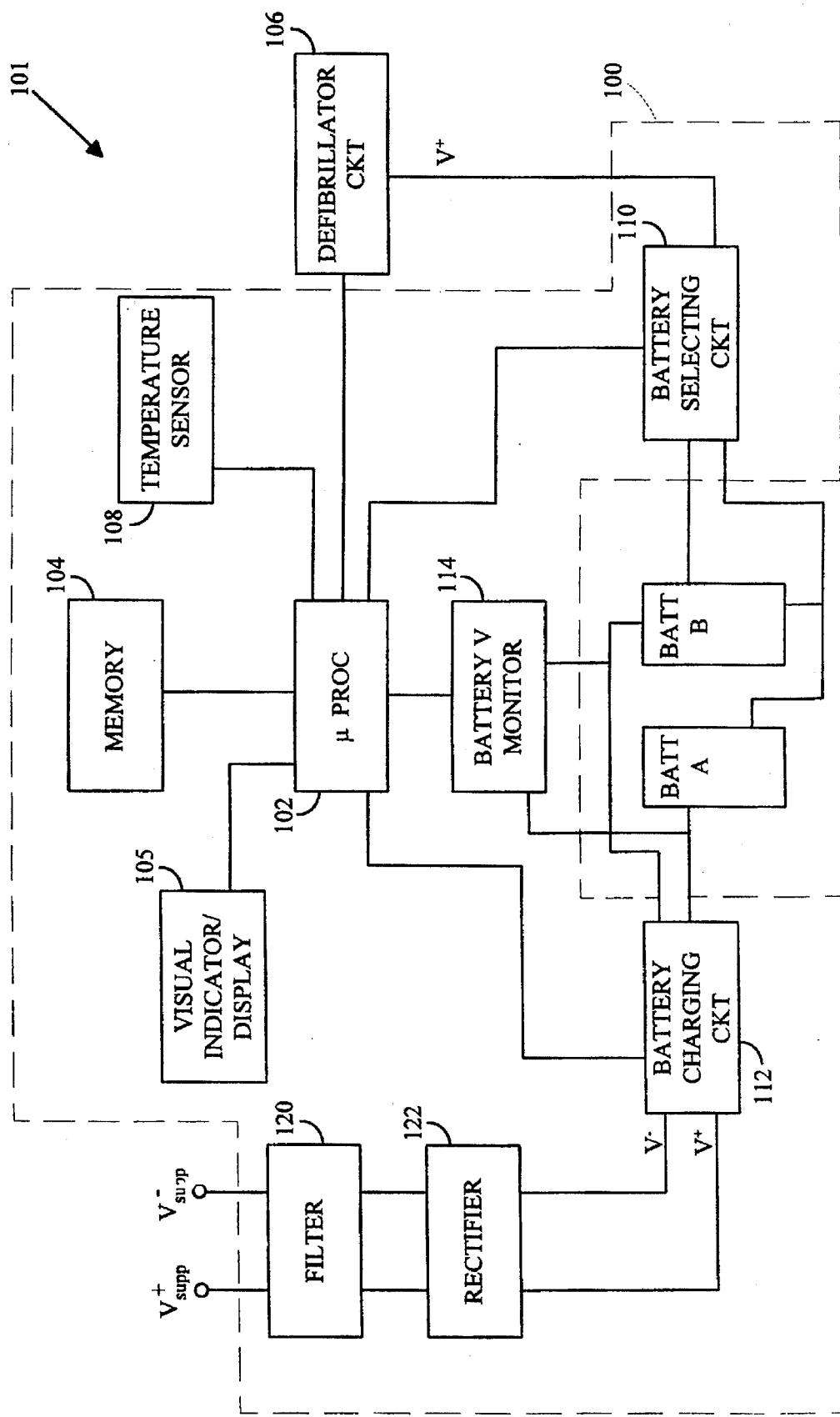
FIG. 1 is a block diagram of a system for automatically selecting and charging multiple batteries under the present invention.

A battery selecting and charging system 100, shown in FIG. 1, is referred generally herein as the selecting/charging system 100. The selecting/charging system 100 forms part of portable electronic unit 101, preferably a portable emergency electronic device such as a defibrillator or other emergency medical device. As shown in FIG. 1, a microprocessor 102 is coupled to a memory 104, a visual indicator/display 105, a temperature sensor 108, and other circuitry, such as defibrillator circuitry 106. The memory 104, which stores the below described routines performed by the microprocessor 102, may be read-only memory ("ROM"), random access memory ("RAM") or other types of memory. The memory 104 may be monolithically integrated with the microprocessor 102 or located off-chip. The selecting/charging system 100 includes a battery selecting circuit 110 (shown in FIGS. 2 and 3) and a battery charging circuit 112 (shown in FIGS. 9 and 10), both coupled to the microprocessor 102. A filter 120 and a rectifier 122 are coupled in series between a voltage supply $Vsupp^+$, $Vsupp^-$ and the battery charging circuit 112, so that either an AC or DC external voltage source may be used to recharge the batteries.

Figure 2:
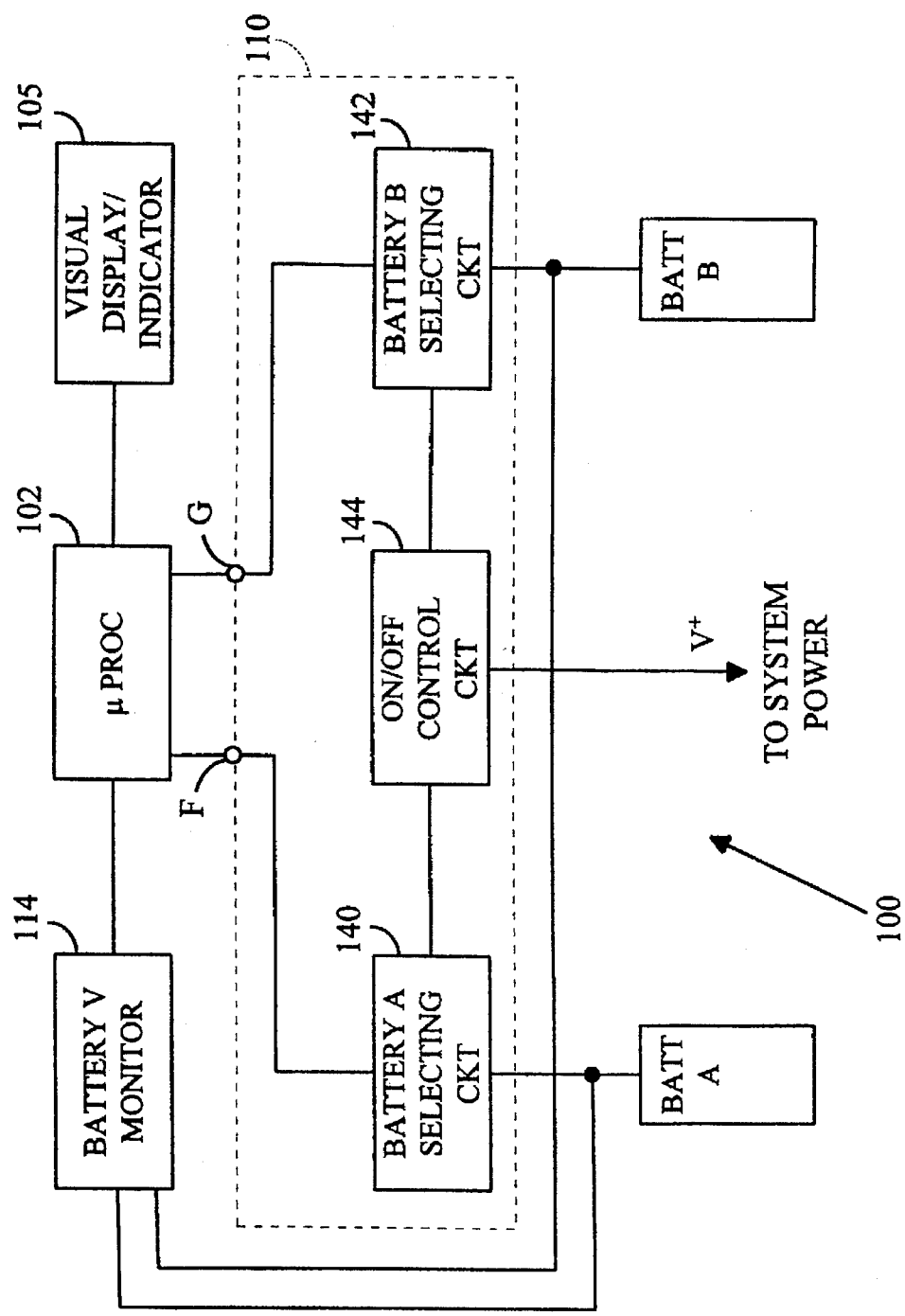
FIG. 2 is a block diagram of a battery selecting circuit for the system of FIG. 1.
Figure 3:
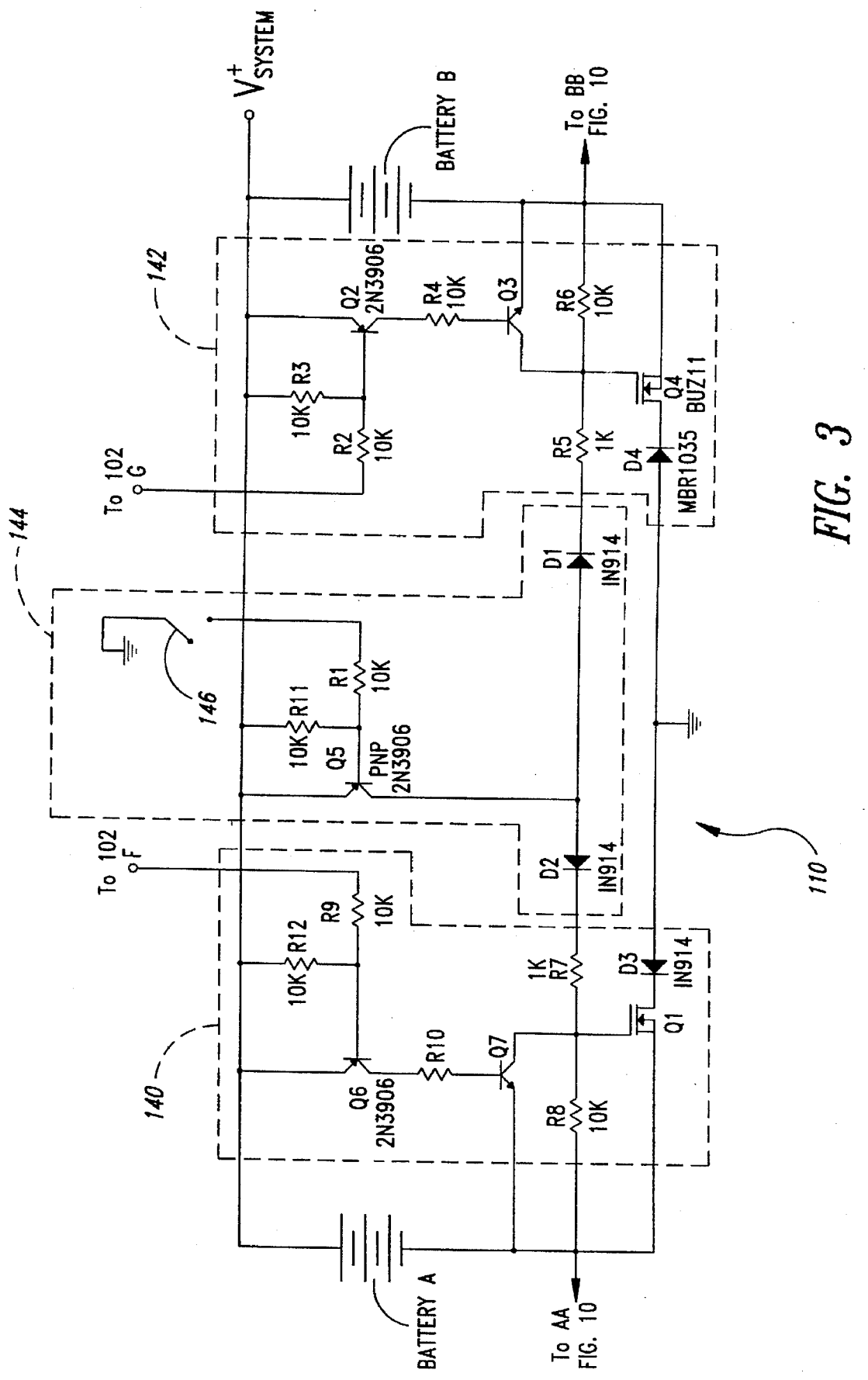
FIG. 3 is a schematic diagram of the battery selection circuit of FIG. 2.

Referring to FIGS. 2 and 3, the battery selecting circuit 110 receives instruction signals from the microprocessor 102 and selects one of several batteries to power the unit 101 (including the defibrillator circuitry 106). The selecting/charging system 100 is preferably coupled to two rechargeable batteries, a battery A and a battery B. As shown in FIG. 2, the battery selecting circuit 110 includes a battery A selecting circuit 140 coupled to the battery A and a battery B selecting circuit 142 coupled to the battery B. The battery A and B selecting circuits 140 and 142 are coupled to the microprocessor 102 at nodes F and G, respectively. Based on battery A and B selecting signals output from the microprocessor 102 to the nodes F and G, the battery A or B selecting circuits 140 or 142 couple either the battery A or the battery B to the defibrillator circuitry 106 (and to the unit 101), all respectively. The routine performed by the microprocessor 102 to determine which battery to select is discussed more fully below.

An on/off control circuit 144 is coupled between the battery selecting circuits 140 and 142. As shown in FIG. 3, the on/off control circuit 144 includes an operator actuatable unit power switch 146. When the switch 146 is in the "on" position, both transistors Q1 and Q4 turn on which in turn couples the batteries A and B to the unit 101. Diodes D1 and D2 cause the battery having a greater charge (battery A or B) to provide power to the unit 101. Soon after switching the switch 146 on, however, the microprocessor 102 senses that power has been provided to the unit 101 and performs the below described routine to select an appropriate battery to power the unit 101. Under this routine, the microprocessor 102 outputs either the battery A or B selecting signals to uncouple either the battery A or the battery B from the system. In this way, if the microprocessor 102 malfunctions and no battery selecting signal is output therefrom, both the batteries A and B are still coupled to the unit 101 to provide power thereto. Specifically, the microprocessor 102 outputs either the battery A or B selecting signals to the nodes F or G, respectively. In response thereto, transistor Q6 or Q2 switches off, switching transistor Q1 or Q4 off, and in turn, uncoupling battery A or B from the unit 101, all respectively.

Figure 4:
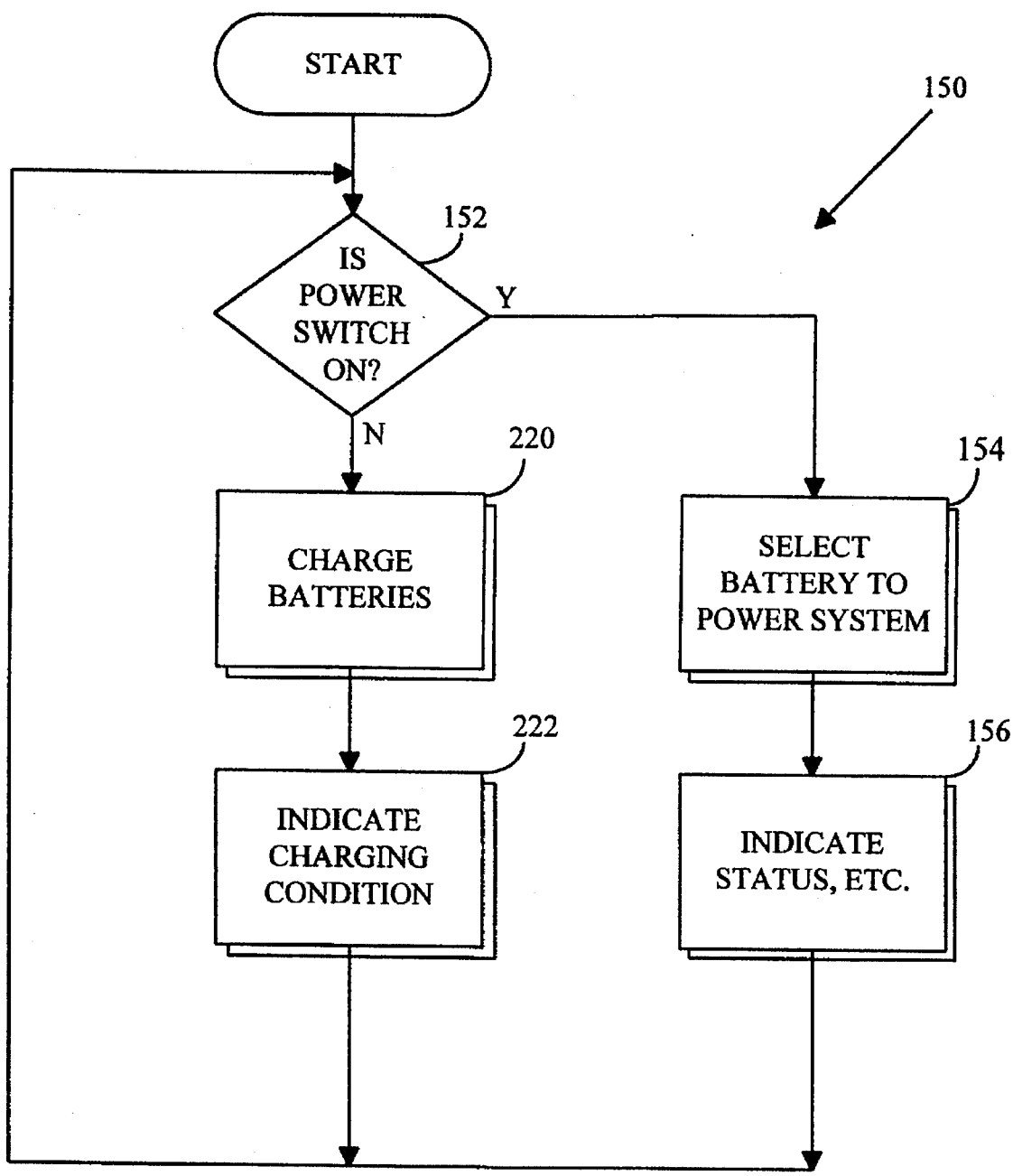
FIG. 4 is a flow chart of a method for selecting and charging multiple batteries under the present invention.

FIG. 4 shows a general routine 150 performed by the microprocessor for selecting and charging multiple batteries. The microprocessor 102 monitors whether power is being provided to the unit 101 by the batteries and thereby determines whether the power switch 146 is on in step 152. If the switch 146 is on, the microprocessor 102 selects the appropriate battery to power the system in step 154 and indicates the status of the system in routine 156. If the power switch 146 is off in step 152, then the microprocessor 102 charges the batteries in a step 220 (if necessary) and indicates the charging condition of the batteries in a step 222. All of these steps are described more fully below.

Figure 5:
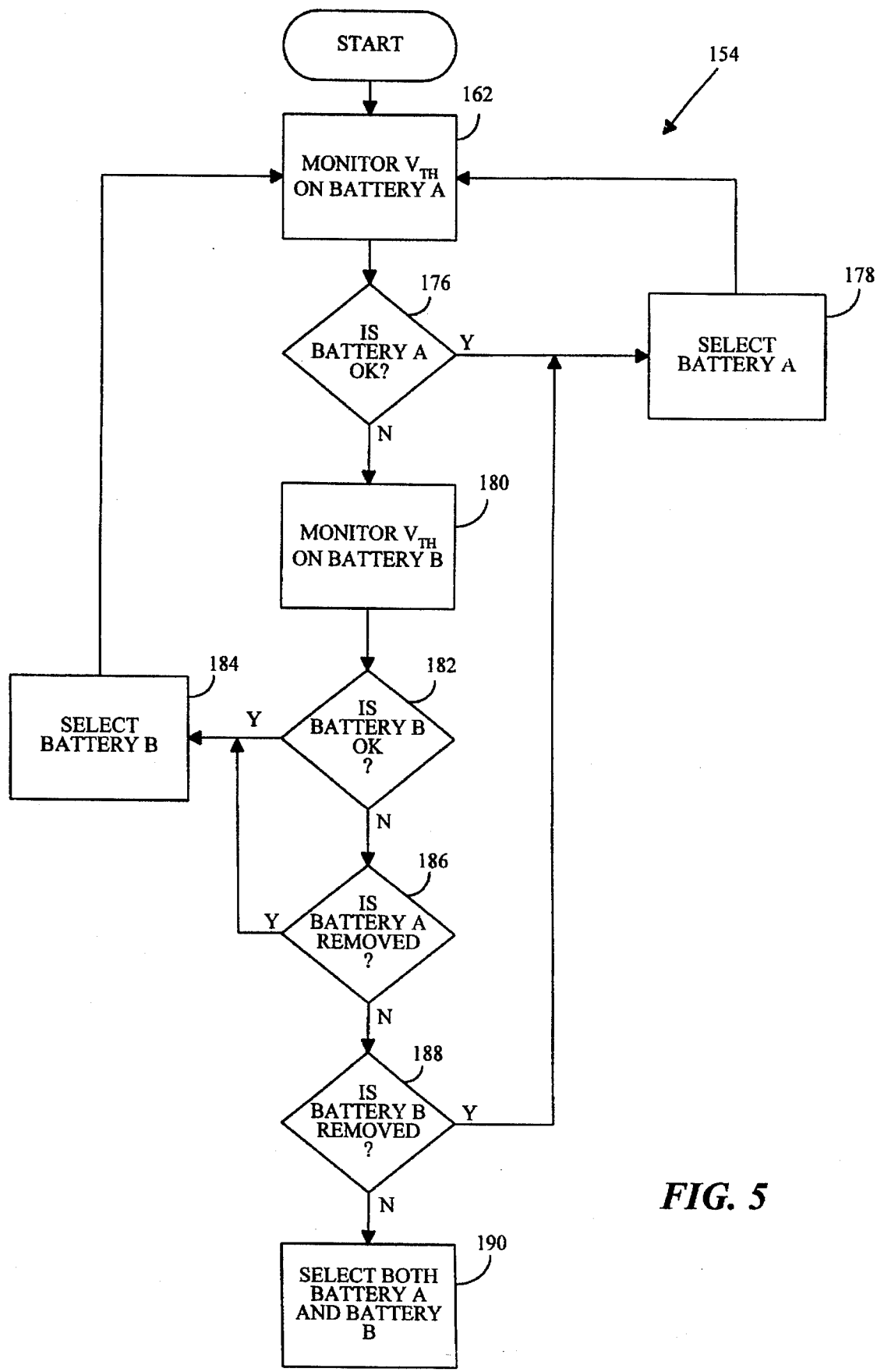
FIG. 5 is a flow chart of a method of selecting multiple batteries under the present invention.
Figure 15:
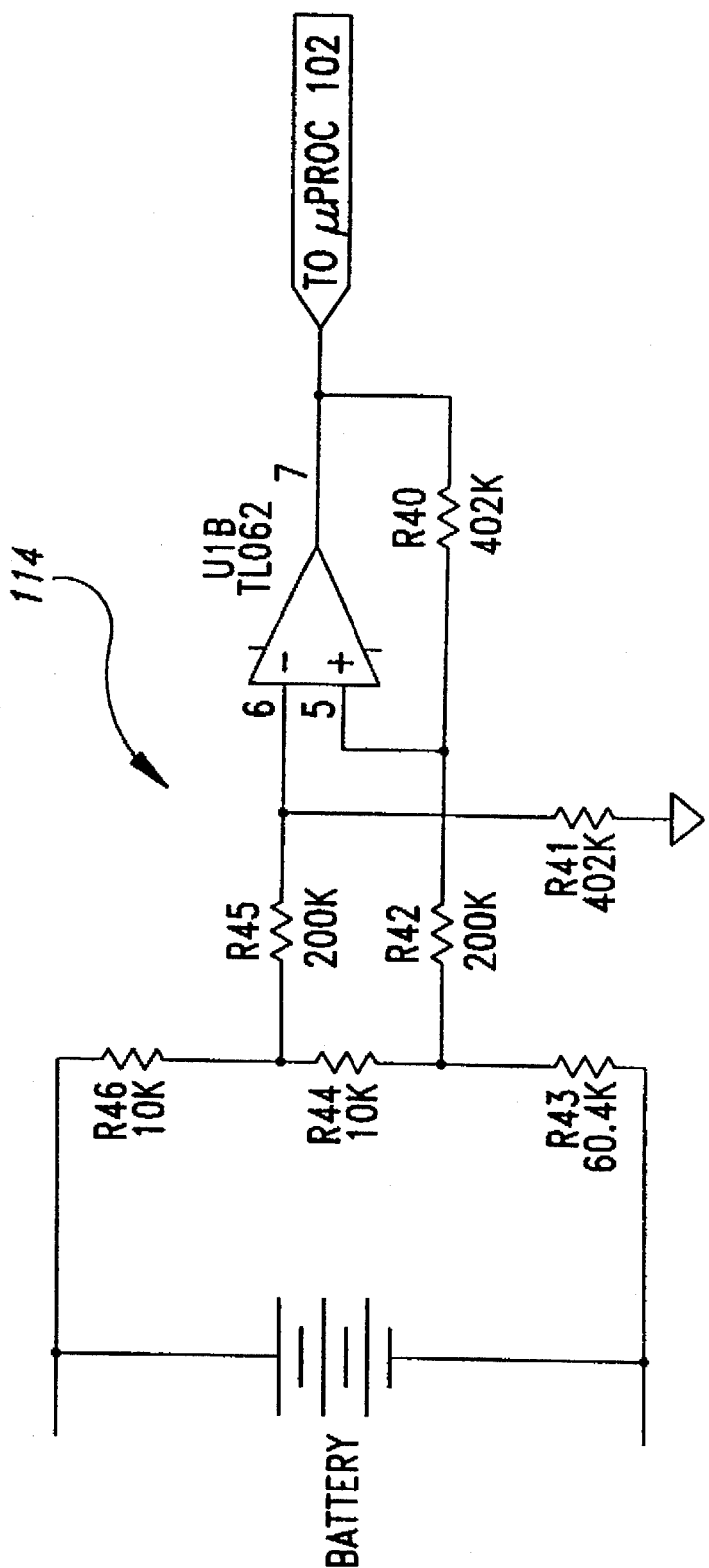
FIG. 15 is a schematic diagram of an example of a battery voltage monitoring circuit for the system of FIG. 1.

A method of selecting the appropriate battery is shown in FIG. 5 as a routine 154. The microprocessor 102 begins in a step 162 by monitoring the voltage on the battery A. As shown in FIG. 2, a battery voltage monitoring circuit 114 is coupled to both batteries A and B and to the microprocessor 102. The battery voltage monitoring circuit 114 outputs signals to the microprocessor 102 indicating the present voltage at the terminals of the batteries A and B, and the microprocessor 102 may thereby monitor the voltage on the batteries. Battery voltage monitoring circuits are known to those of ordinary skill in the art. An example of the battery voltage monitoring circuit 114 is shown in FIG. 15. The output of the battery voltage monitoring circuit 114 is digitized by an appropriate analog to digital converter (not shown) before being input to the microprocessor 102. The analog to digital converter may be included on the same chip as the microprocessor 102, or it may be a separate analog to digital converter circuit coupled between the battery voltage monitoring circuit 114 and the microprocessor.

The batteries A and B are preferably received by and electrically coupled to a pair of terminals in slots (not shown) within the unit 101 labeled "A" and "B". The battery voltage monitoring circuit 114 is coupled to each pair of terminals in the slots A and B, and thus, the circuit 114 outputs voltage signals representing the voltage across each pair of terminals. Therefore, while the description herein generally refers to the "terminal voltage," "battery voltage" or the "voltage on the battery," these voltages are measurements of the voltages across the appropriate terminals in slot A or B.

Generally, the state of a charge in a battery is not simply a voltage measurement because loading effects on the battery are approximate in nature. For example, the load current on the unit 101 changes when the capacitor in the defibrillator circuit 106 is being charged, or if a thermal printer coupled to the unit 101 were activated. If the system simply measured the terminal voltage, it would be confusing to an operator when the system indicated a frequently changing battery threshold. For example, the system would indicate at one time that the battery is depleted and then a few moments later indicate that it is two-thirds full. Therefore, the microprocessor 102 preferably compares the present voltage on the batteries to a threshold voltage $V_{TH}$ selected for each battery which may be equal to one of six "thresholds". The six thresholds are estimates of the percent capacity at various load currents for a given battery and are referred to herein as: battery full ("BATT_FULL"), battery two-thirds ("BATT_TWO_THIRDS"), battery one-third ("BATT_ONE_THIRD"), battery depleted ("BATT_DEPLETED"), battery service mandatory ("BATT_SVC_MAND"), and battery removed ("BATT_REMOVED"). While BAT_FULL is generally referred to herein as a threshold, it represents any terminal voltage on a battery above the BATT_TWO_THIRDS threshold.

If the monitored terminal voltage on a battery ever goes below its present threshold $V_{TH}$, a new threshold voltage $V_{TH}$ is set for that battery until that battery is removed, even though the voltage on that battery may have only temporarily dropped. Consequently, while the terminal voltage may vary frequently, the threshold voltage $V_{TH}$ varies much less frequently.

Despite the fact that changes in load current affect the terminal voltage, a battery does not respond to changes immediately. The rate of change from one battery threshold $V_{TH}$, to another is only generally known in the art, and will vary from one battery to another. Furthermore, during a battery's lifetime, the thresholds $V_{TH}$ for it will change. In light of these variables, a relationship, rather than a lookup table, is preferably used by the present invention to accurately reflect the terminal voltage on a given battery. Additionally, the unit 101 is preferably upgradeable to include additional functionality. The additional functionality will likely change the load current on the unit 101, and thus any relationship of battery terminal voltage should be unaffected by this additional functionality.

Figure 6:
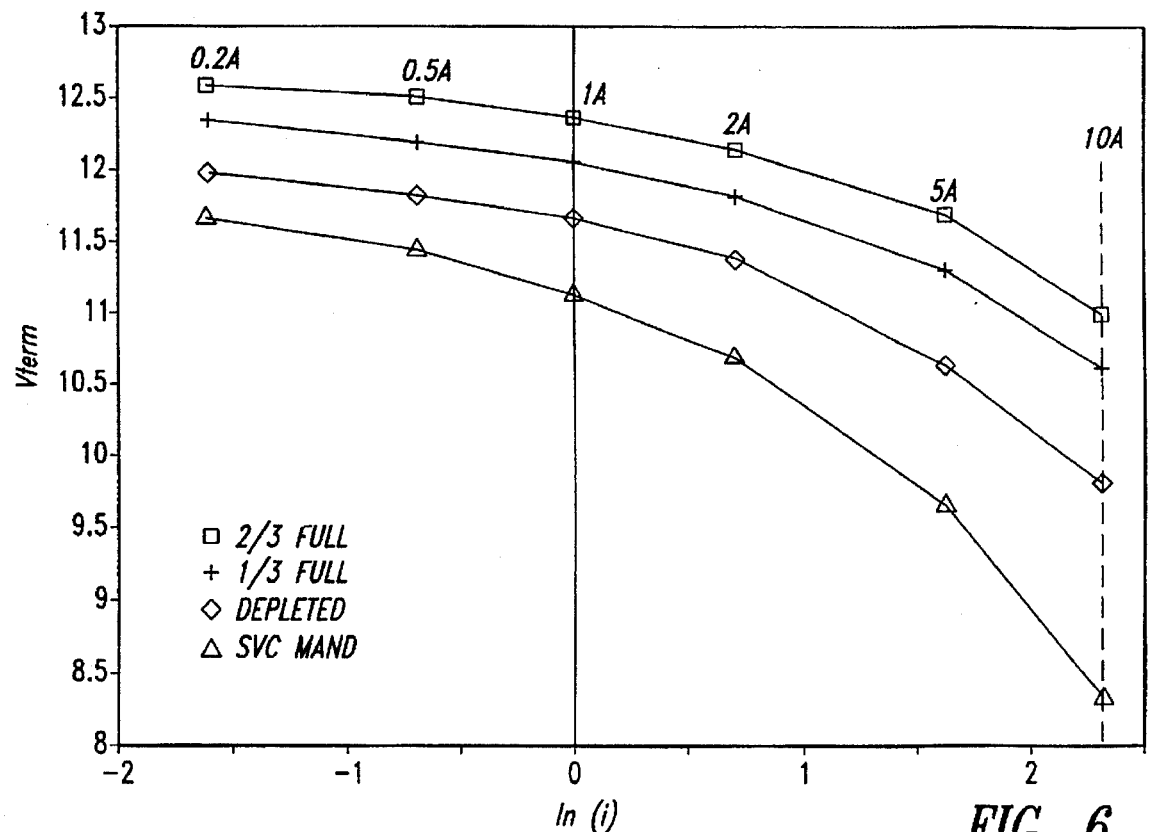
FIG. 6 is a graph of the terminal voltage as a function of the log of the load current on a typical battery used in the present invention.

Batteries A and B are preferably sealed lead acid batteries, such as model number LCS2012DVBNC manufactured by Panasonic®. This battery has a full capacity of 13.5 volts and a maximum safe depleted capacity (or "service mandatory" capacity as used herein) of approximately 8.5 volts. Other rechargeable batteries, however, may be used instead. Experimentation with this battery has found that the following relationship exists:

$$V_{TH}=A(I^{2/3})+B, \qquad (1)$$

where I is the total load current on the unit 101, and A and B are constants. Other batteries likely have a similar relationship. As shown in FIG. 6, at various battery capacity levels, the terminal voltage follows the relationship (1). Specifically, FIG. 6 shows that for various load currents (shown as the natural log of the load current or ln(I)) the terminal voltage for the battery follows the relationship (1), regardless of the capacity of the battery (i.e., whether the battery was two-thirds full, one-third full, depleted, or service mandatory).

In light of this predictable relationship, the six voltage thresholds $V_{TH}$ may be determined for the batteries A and B. The thresholds BATT_TWO_THIRDS and BATT_ONE_THIRD do not correspond to the total capacity of a given battery (i.e., for a battery having a capacity of 12 volts, the threshold BATT_TWO_THIRDS is not equal to 8 volts). Instead, the BATT_SVC_MAND threshold, the lowest threshold, is set above 8 volts for a 10 amp load current. This lowest threshold is set well above 0 volts to prevent a battery from being nearly completely depleted because batteries nearly fully drained of their charge are difficult to recharge and may be damaged. Additionally, any battery having a terminal voltage above the BATT_SVC_MAND threshold may still deliver reliable charge to the unit 101. With emergency electronic equipment, such as a defibrillator, this additional charge within the battery can prove lifesaving.

Having selected the BATT_SVC_MAND threshold, the BATT_DEPLETED, BATT_ONE_THIRD and BATT_TWO_THIRDS thresholds are selected by appropriately scaling, approximately equally, the BATT_SVC_MAND threshold voltage upward. These thresholds will likely be only estimates for a given battery and are preferably based on a manufacturer's data for a given rechargeable battery and/or other test data. The constants A and B are also determined for each threshold. The constants A and B for each threshold level are then estimated then using data produced by battery life tests. In light of the relationship (1), the threshold voltage $V_{TH}$ varies predictably in light of changes in the load current I. As noted above, terminal voltage on the battery above the BATT_TWO_THIRDS threshold is considered BATT_FULL. A very low terminal voltage, but not necessarily zero volts, corresponds to the BATT_REMOVED threshold, because of internal bias within the unit 101.

FIG. 6 shows the various preferred threshold voltages $V_{TH}$ for the preferred Panasonic battery noted above. For example, with a load current of one amp, the threshold voltages $V_{TH}$ are approximately 12.38, 12.13, 11.75, and 11.25 volts for the thresholds BATT_TWO_THIRDS, BATT_ONE_THIRD, BATT_DEPLETED, and BATT_SVC_MAND, respectively. Similarly, for a load current of five amps, the threshold voltages $V_{TH}$ are approximately 11.75, 11.38, 10.75, and 9.75 volts for the thresholds BATT_TWO_THIRDS, BATT_ONE_THIRD, BATT_DEPLETED, and BATT_SVC_MAND, respectively.

In light of the predictable relationship (1), the microprocessor 102 continuously monitors the terminal voltage on the batteries A and B and the total load current I on the unit 101. The microprocessor 102 adjusts the present threshold voltage $V_{TH}$ to reflect changes in the total load current I. The microprocessor 102 also continuously compares the terminal voltage on the batteries A and B and compares them to the present threshold voltage $V_{TH}$ (appropriately adjusted for the present load current I) and sets a new threshold $V_{TH}$ if the terminal voltage ever drops below the present threshold voltage $V_{TH}$. Erratic voltage readings on the batteries A and B are thereby eliminated. An example of a method of monitoring the voltage on the batteries A and B is depicted in FIG. 7.

Figure 7:
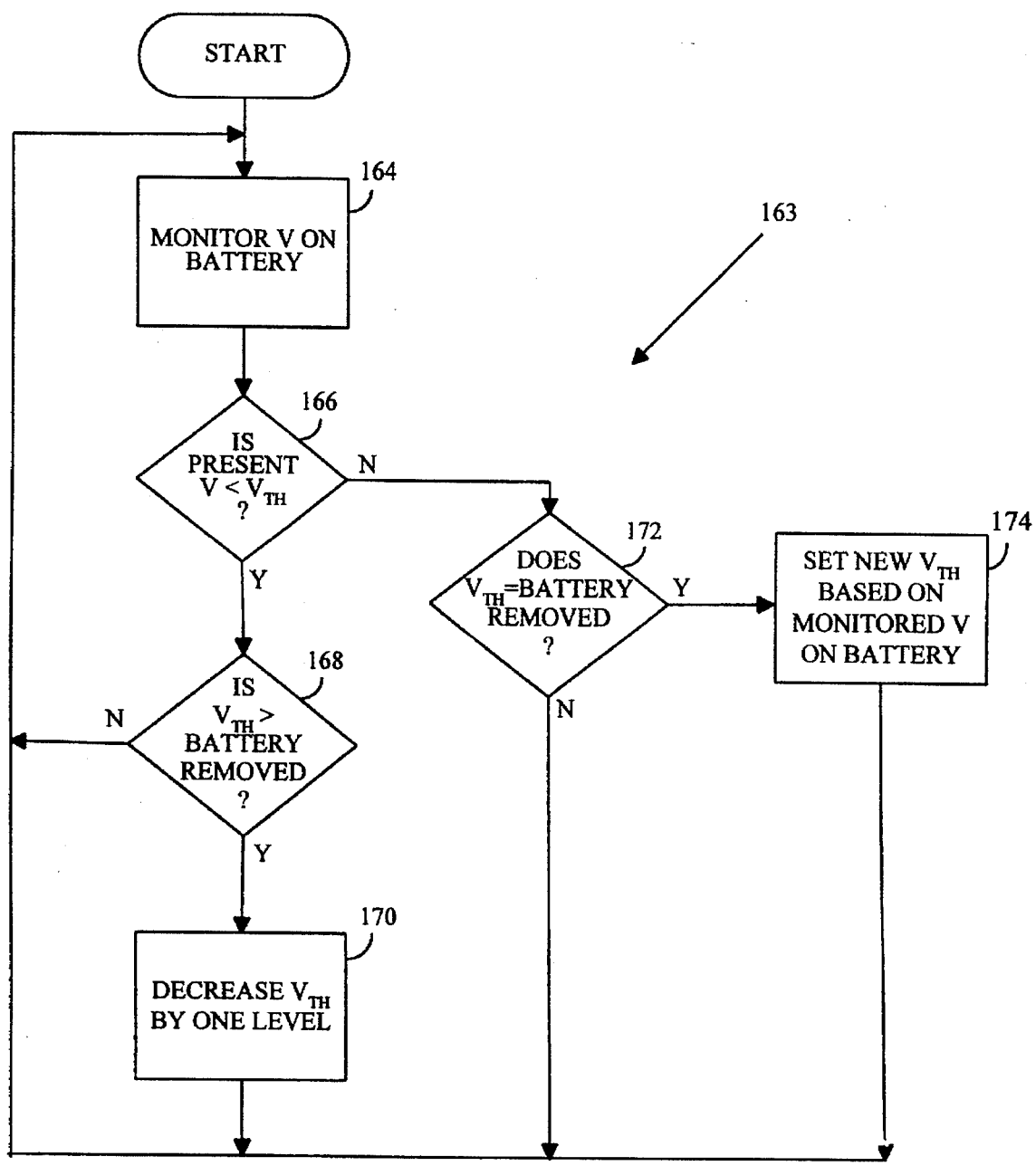
FIG. 7 is a flow chart of a method of monitoring the voltage of multiple batteries under the present invention.

As shown in FIG. 7, the microprocessor 102 performs a routine 163 which adjusts the threshold voltage $V_{TH}$ for each battery. The microprocessor 102 monitors the voltage on one of the batteries in a step 164 by monitoring the voltage signals output from the battery voltage monitoring circuit 114. In a step 166, the microprocessor 102 determines whether the present voltage on this battery is less than the present threshold voltage $V_{TH}$ (modified to the present load current I). If the present voltage is less than the threshold voltage $V_{TH}$, then the microprocessor 102 determines whether the present threshold voltage $V_{TH}$ is greater than the BATT_REMOVED threshold voltage in a step 168. If it is not, then the routine 163 loops back to monitoring the voltage on the battery in step 164. If the present threshold voltage $V_{TH}$ is greater than the BATT_REMOVED threshold voltage, then in a step 170, the microprocessor 102 decreases the present threshold voltage $V_{TH}$ by one level.

For example, if the threshold voltage $V_{TH}$ is BATT_TWO_THIRDS, and the present voltage on the battery A is below this threshold, then the microprocessor 102 proceeds from the step 166 to the step 168. Since the threshold voltage $V_{TH}$ is greater than the threshold BATT_REMOVED, the BATT_TWO_THIRDS threshold voltage is decreased to the next level, i.e., BATT_ONE_THIRD. Thereafter, the routine 163 loops back to monitoring the voltage on the battery in step 164.

If the microprocessor 102 in step 166 determines that the present voltage on the battery is not less than the present threshold voltage $V_{TH}$, then the microprocessor determines whether the present threshold voltage $V_{TH}$ is equal to the BATT_REMOVED threshold in a step 172. If it does not, the routine 163 loops back to monitoring the battery's voltage in step 164. If it does, then the microprocessor 102 sets the current threshold voltage $V_{TH}$ to a new threshold based on the voltage monitored on the battery in a step 174. For example, if a new battery is placed into the unit 101, and the microprocessor 102 determines that the voltage on this new battery is above the BATT_ONE_THIRD threshold voltage, but below the BATT_TWO_THIRDS threshold voltage, then the new $V_{TH}$ threshold is set at BATT_ONE_THIRD. Thereafter, the routine loops back to monitoring the battery's voltage in step 164.

The following table shows the various threshold states which each of the batteries A and B may have.

If the battery A is not ok, then the microprocessor 102 monitors the voltage on the battery B in a step 180 and determines its present threshold $V_{TH}$ as described above. Thereafter, the microprocessor 102 determines if the battery B is ok in a step 182. If the battery B is ok, then the microprocessor 102 selects the battery B to power the unit 101 in a step 184. If the battery B is not ok, then the microprocessor determines whether the battery A is removed in a step 186. If the battery A is removed (i.e., its threshold $V_{TH}$ is BATT_REMOVED) then the microprocessor 102

TABLE 1

| Last Battery | Battery Condition | | |
|---|---|---|---|
| | Present Battery Condition | | |
| Condition | BATT_REMOVED | BATT_SVC_MAND | BATT_DEPLETED |
| BATT_REMOVED | BATT_REMOVED | BATT_SVC_MAND | BATT_DEPLETED |
| BATT_SVC_MAND | BATT_REMOVED | BATT_SVC_MAND | BATT_SVC_MAND |
| BATT_DEPLETED | BATT_REMOVED | BATT_SVC_MAND | BATT_DEPLETED |
| BATT_ONE_THIRD | BATT_REMOVED | BATT_SVC_MAND | BATT_DEPLETED |
| BATT_TWO_THIRDS | BATT_REMOVED | BATT_SVC_MAND | BATT_DEPLETED |
| BATT_FULL | BATT_REMOVED | BATT_SVC_MAND | BATT_DEPLETED |

| Last Battery | Present Battery Condition | | |
|---|---|---|---|
| Condition | BATT_ONE_THIRD | BATT_TWO_THIRDS | BATT_FULL |
| BATT_REMOVED | BATT_ONE_THIRD | BATT_TWO_THIRDS | BATT_FULL |
| BATT_SVC_MAND | BATT_SVC_MAND | BATT_SVC_MAND | BATT_SVC_MAND |
| BATT_DEPLETED | BATT_DEPLETED | BATT_DEPLETED | BATT_DEPLETED |
| BATT_ONE_THIRD | BATT_ONE_THIRD | BATT_ONE_THIRD | BATT_ONE_THIRD |
| BATT_TWO_THIRDS | BATT_ONE_THIRD | BATT_TWO_THIRDS | BATT_TWO_THIRDS |
| BATT_FULL | BATT_ONE_THIRD | BATT_TWO_THIRDS | BATT_FULL |

As the above table shows, the present threshold $V_{TH}$ on a battery depends upon the previous threshold $V_{TH}$ of that battery. Therefore, if the present voltage level on the battery is above the BATT_DEPLETED threshold, and the previous threshold was BATT_TWO_THIRDS, the new threshold is the present threshold (i.e., BATT_DEPLETED).

The terminal voltage on a battery also changes as a function of temperature. Therefore, the selecting/charging system 100 can include a temperature sensor 108 coupled to the microprocessor 102. The relationship (1) can be readily modified by one skilled in the relevant art to include a temperature compensation factor. The microprocessor 102, in response to signals received from the temperature sensor 108, adjusts the thresholds accordingly in light of the new relationship (1).

Referring back to FIG. 5, after monitoring the voltage on the battery A in step 162 and determining its present threshold $V_{TH}$ as described above, the microprocessor 102 determines whether the battery A is "ok" in a step 176. As used generally herein, a battery is "ok" if its present threshold $V_{TH}$ is above the BATT_DEPLETED (i.e., BATT_FULL, BATT_TWO_THIRDS, or BATT_ONE_THIRD). If the battery A is ok, then in a step 178, the microprocessor 102 outputs the battery A selecting signal to the node F (FIG. 3), causing the battery A selecting circuit 140 to couple the battery A to the unit 101 to provide power thereto. The selecting/charging system 100 has a bias toward battery A whereby if battery A is ok, it is always selected to power the unit 101. The selecting/charging system 100 does not switch back and forth between multiple batteries, partially depleting these batteries, but instead, requires the unit 101 to deplete battery A before switching to the battery B. As noted above, partially depleted batteries are less reliable than batteries which are not so depleted.

selects the battery B to power the unit 101 in step 184 by outputting the battery B selecting signal to the battery B selecting circuit 142. If the battery A has not been removed, then the microprocessor 102 determines whether the battery B has been removed in a step 188. If the battery B has been removed, then the microprocessor 102 selects the battery A to power the unit 101 in step 178. If the battery B has not been removed, then the microprocessor selects both batteries A and B to power the unit 101 in a step 190 by outputting both the battery A and B selecting signals to the battery A and B selecting circuits and 140 and 142.

A table showing the various possibilities for the batteries A and B to power the unit 101 are shown in the following table.

TABLE 2

| Battery Selection to Power the Unit | | | | |
|---|---|---|---|---|
| | Batt B State | | | |
| Batt A State | batt ok | batt depleted | service mandatory | batt removed |
| batt ok | Batt A | Batt A | Batt A | Batt A |
| batt depleted | Batt B | Both | Both | Batt A |
| batt service mandatory | Batt B | Both | Both | Batt A |
| batt removed | Batt B | Batt B | Batt B | — |

Figure 8:
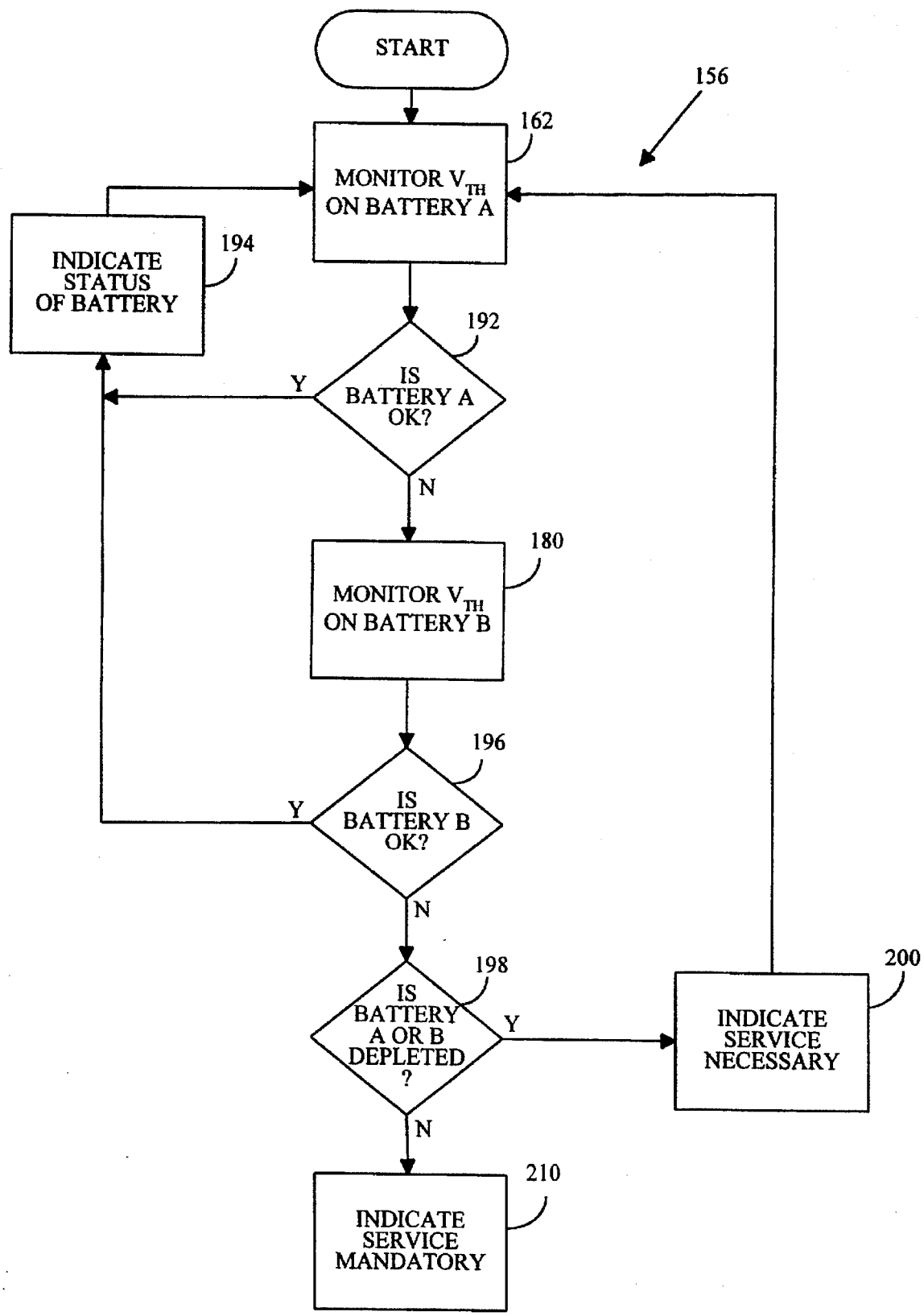
FIG. 8 is a flow chart of a method of indicating a status for each of multiple batteries under the present invention.

As shown in FIG. 4, the selecting/charging system 100 also indicates the status of the batteries A and B in the routine 156. Referring to FIG. 8, the microprocessor 102 monitors the voltage on the battery A in step 162 as described above, and determines if battery A is ok in a step 192. If battery A is ok, then in a step 194, the microprocessor 102 indicates the status of battery A on a visual indicator/display 105 (shown in FIG. 1). The visual indicator/display 105 preferably includes an LCD or similar display to graphically show the batteries A and B as fully colored, two-thirds colored, one-third colored, and uncolored (simply the outline of a battery) to reflect the thresholds BATT_FULL, BATT_TWO-THIRDS, BATT_ONE_THIRD, and BATT_DEPLETED, respectively. If the battery A is not ok, then the microprocessor 102 monitors the voltage on the battery B in step 180 as described above and determines if the battery B is ok in a step 196. If the battery B is ok, the microprocessor 102 outputs an appropriate signal to the visual indicator/display 105 to graphically indicate the status of battery B thereon in step 194.

If battery B is not ok, then the microprocessor 102 determines whether either of batteries A or B are depleted in a step 198. If either battery A or B is depleted, then in a step 200, the microprocessor 102 indicates "service necessary," by outputting an appropriate signal for displaying a message such as "batteries low, service necessary" to the operator on the visual indicator/display 105. The microprocessor 102 also preferably outputs an appropriate signal to a speaker (not shown) which in turn produces an audible tone. If battery A or B are not depleted, then the microprocessor 102 indicates "service mandatory" in a step 210 by providing appropriate signals to the visual indicator/display 105 for indicating on the display the message "service mandatory-change batteries," and to the speaker for providing an intermittent or continuous audible tone. In other words, if both batteries A and B are not ok and they are not depleted, they are either service mandatory or removed, but in either case, service is mandatory. The microprocessor 102 also preferably interrupts or halts normal operation of the unit 101 to further indicate to the operator that service is mandatory, requiring interaction by the operator to resume normal operation of the unit 101. These various indications for service mandatory ensure that the operator will not overlook this critical state.

Based on the routine 156, the selecting/charging system 100 does not indicate that service is necessary or mandatory until both batteries A and B are depleted, assuming both batteries are coupled to the system (i.e., not removed). The following table shows the various indications of battery state depending upon the state of both batteries A and B.

TABLE 3

Battery State Indication

| | | Batt B State | | |
|---|---|---|---|---|
| Batt A State | batt ok | batt depleted | service mandatory | batt removed |
| batt ok | ok | ok | ok | ok |
| batt depleted | ok | N Svc | N Svc | N Svc |
| batt service mandatory | ok | N Svc | Svc M | Svc M |
| batt removed | ok | N Svc | Svc M | — | where "ok" means do not provide any service necessary display, "N Svc" means provide the service necessary display/tone, and "Svc M" means provide the service mandatory display/tone.

Figure 9:
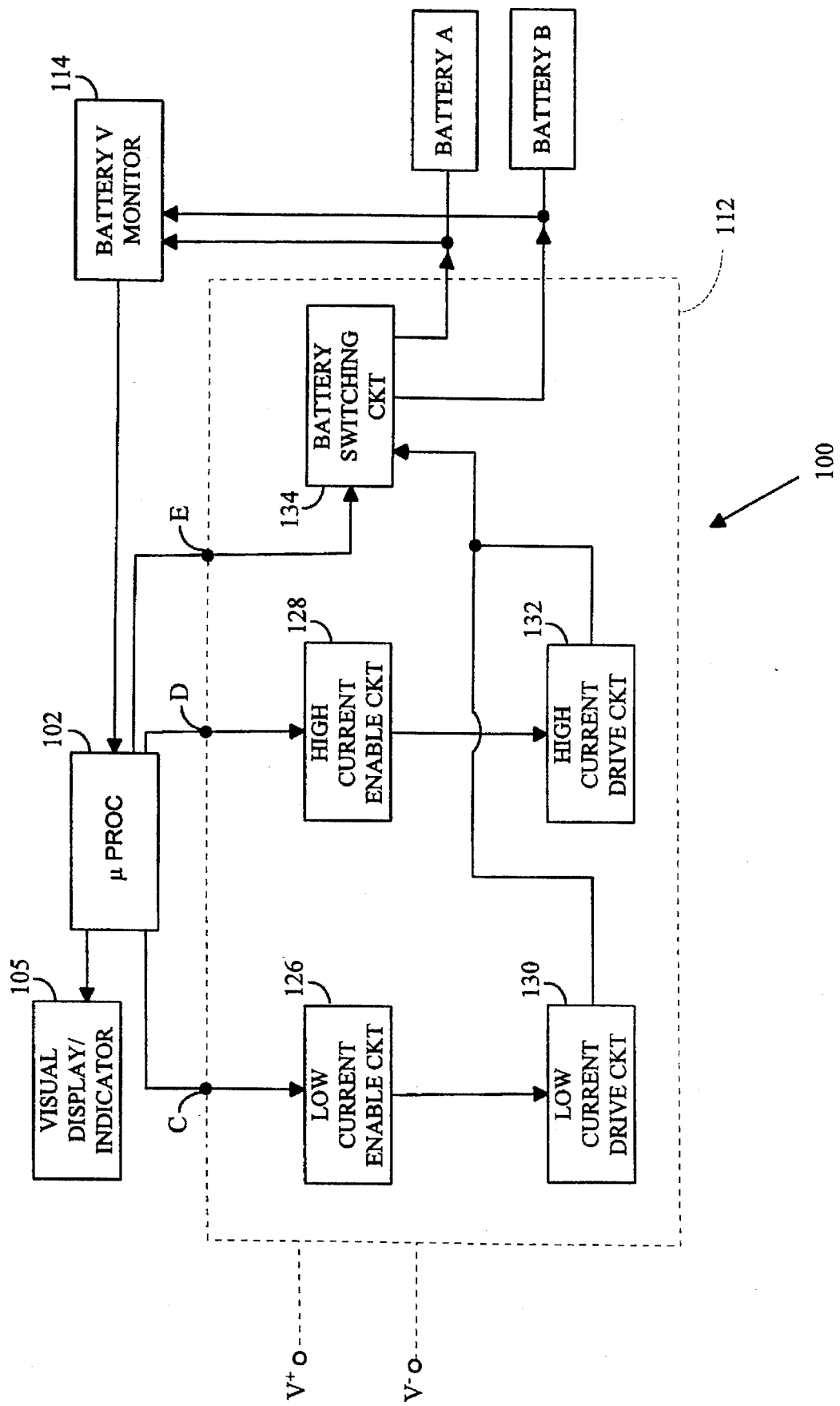
FIG. 9 is a block diagram of a battery charging circuit for the system of FIG. 1.
Figure 10:
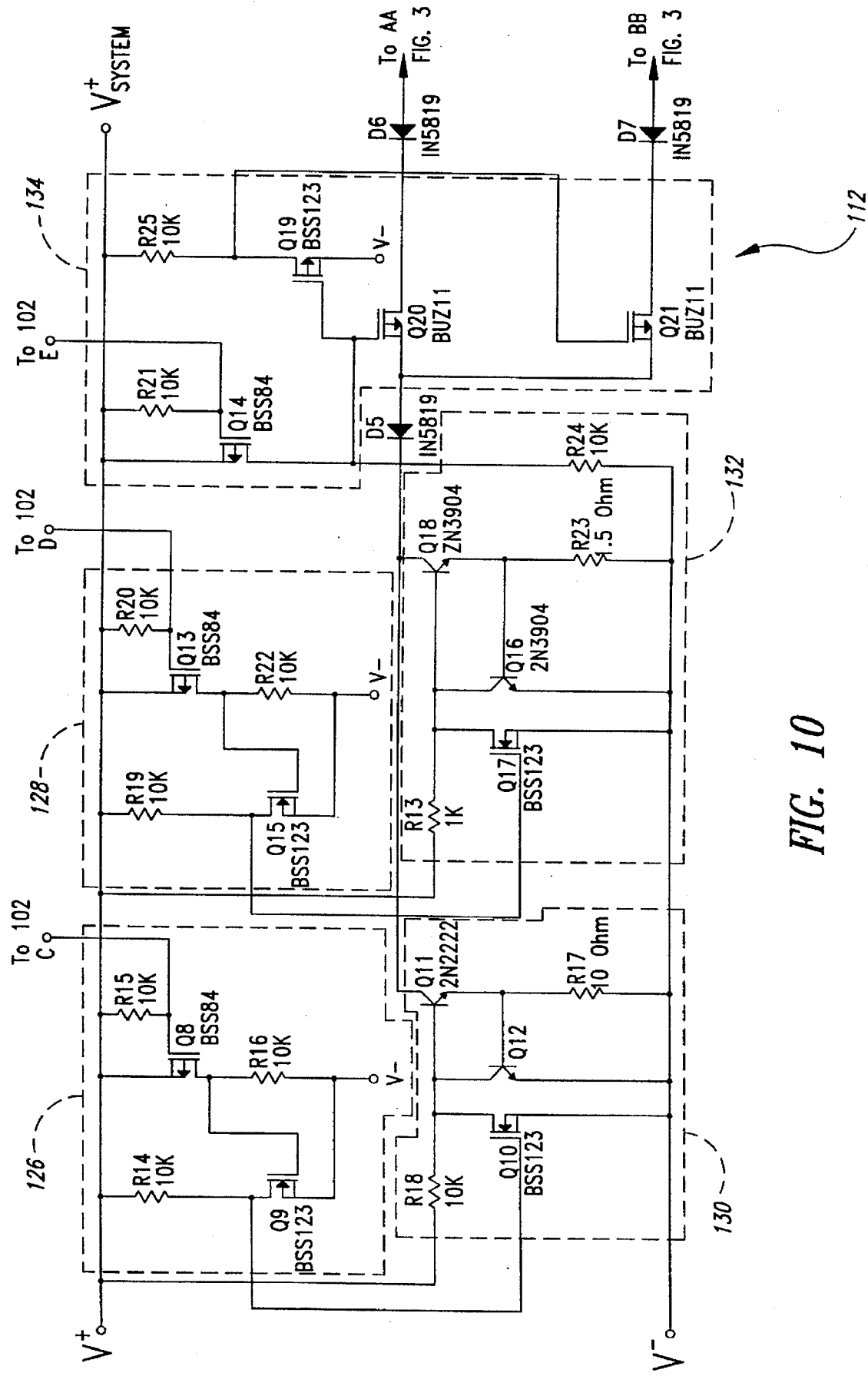
FIG. 10 is a schematic diagram of the battery charging circuit of FIG. 9.

Referring now to FIGS. 9 and 10, the battery charging circuit 112 of the present invention uses high and low current charging circuits to provide the most rapid charging of multiple batteries, thus ensuring the reliability of the unit 101. The battery charging circuit 112 is coupled to positive and negative terminals of a voltage supply (shown in FIG. 1 as $V_{SUPP}^+$ and $V_{SUPP}^-$). The battery charging circuit 112 preferably may draw energy from both an AC or a DC source. Consequently, as shown in FIG. 1, a filter 120 and a rectifier 122 are coupled in series between the voltage supply terminals $V_{SUPP}^+$ and $V_{SUPP}^-$ and the battery charging circuit 112. The filter 120 removes any transient spikes or other noise which may damage the circuitry of the unit 101. For example, the battery charging circuit 112 preferably accepts 9- to 17-volt DC input from an automobile over the terminals $V_{SUPP}^+$ and $V_{SUPP}^-$. The filter 120 therefore is preferably a transient suppressor filter or "transorb," known by those skilled in the relevant art. The rectifier 122 preferably is a full wave rectifier capable of converting AC power to DC volts. The unit voltages $V^+$ and $V^-$ are output from the rectifier 122 to the battery charging circuit 112.

The battery charging circuit 112 is directly coupled to both batteries A and B. Referring back to FIG. 9, the battery charging circuit 112 includes a low current section (consisting of a low current enable circuit 126 and a low current drive circuit 130), and a high current section (consisting of a high current enable circuit 128 and a current drive circuit 132). The low and high current enable circuits 126 and 128 are required as an interface between the microprocessor 102 and the low and high current drive circuits 130 and 132. Two such enable circuits 126 and 128 are preferred, rather than a single enable circuit toggling between enabling the low and high current drive circuits 130 and 132, because two such enable circuits allow the microprocessor 102 to turn off both of the low and high current drive circuits. The basic circuitry of the battery charging circuit 112 is described below, followed by a description of a method for charging the batteries A and B according to the present invention.

The microprocessor 102 couples to the low current enable circuit 126 at a node C and provides a low current enable signal to the low current enable circuit 126 at this node. The low current enable circuit 126, in response thereto, provides a low current drive signal to the low current drive circuit 130, enabling the low current drive circuit 132 to output a low charge current to a battery switching circuit 134. Similarly, the microprocessor 102 couples to the high current enable circuit 128 at a node D and provides a high current enable signal to the enable circuit 128 through this node. The high current enable circuit 128, in response thereto, provides a high current drive signal to the high current drive circuit 132, enabling the high current drive circuit 132 to output a high charge current to the battery switching circuit 134. The low and high current drive circuits 130 and 132 preferably provide a continuous 60 milliamp and 0.5 amp current, respectively, to one of the batteries A and B.

The battery switching circuit 134 is coupled to the microprocessor 102 at a node E, to the batteries A and B, and to the low and high current drive circuits 130 and 132. Due to power limitations, only one of the two batteries may be charged at a time. Therefore, after the microprocessor 102 has enabled either the low or high current drive circuits 130 or 132, the microprocessor 102 then provides either a battery A or B switching signal at node E to the battery switching 134. In response thereto, the battery switching circuit 134 provides the current from the selected drive circuit to either the battery A or the battery B.

As shown in more detail in FIG. 10, the microprocessor 102 provides the low current enable signal at the node C to a transistor Q8, turning it on. In response thereto, the transistor Q8 turns on a transistor Q9, which in turn outputs the low current drive signal to a transistor Q10. In response thereto, the transistor Q10 enables transistors Q11 and Q12 to output the low charge current to transistors Q20 and Q21.

Similarly, the microprocessor 102 provides the high current enable signal at the node D to a transistor Q13, turning it on. In response thereto, the transistor Q13 turns on a transistor Q15, which in turn outputs the high current drive signal to a transistor Q17. In response thereto, the transistor Q17 enables transistors Q16 and Q18 to output the high charge current to transistors Q20 and Q21.

Transistors Q20 and Q21 are coupled to the batteries A and B, respectively. A transistor Q14 is coupled to the transistor Q20 and to a transistor Q19, the transistor Q19 in turn being coupled to the transistor Q21. The transistor Q14 receives either the battery A or B switching signal from the microprocessor 102 via the node E and switches either transistor Q20 or Q21 on, respectively, in response thereto. The transistor Q14 thereby toggles between switching on the transistors Q20 and Q21, and thus the high or low charge current may only be applied to either the battery A or the battery B, but not to both of the batteries simultaneously. The details as to how the microprocessor 102 selects the appropriate low or high current drive circuit 130 or 132 and either the battery A or battery B will be described below.

Figure 13:
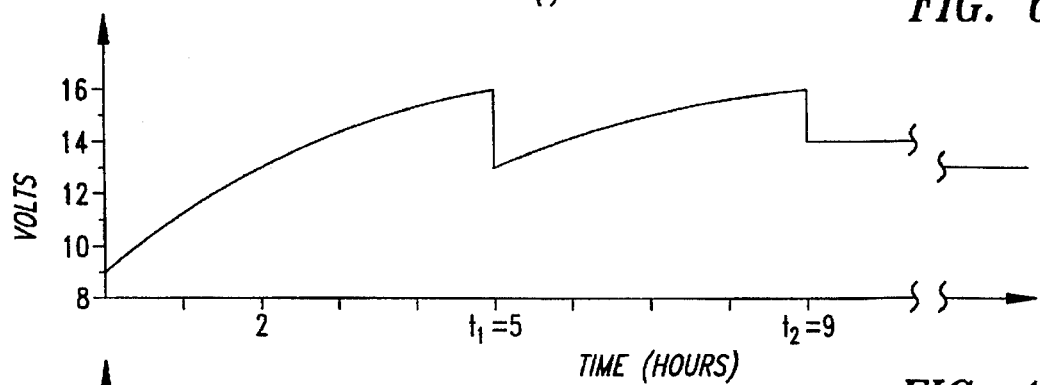
FIG. 13 is a typical graph of the terminal voltage on a battery recharged by the charging circuit of FIG. 9.
Figure 11:
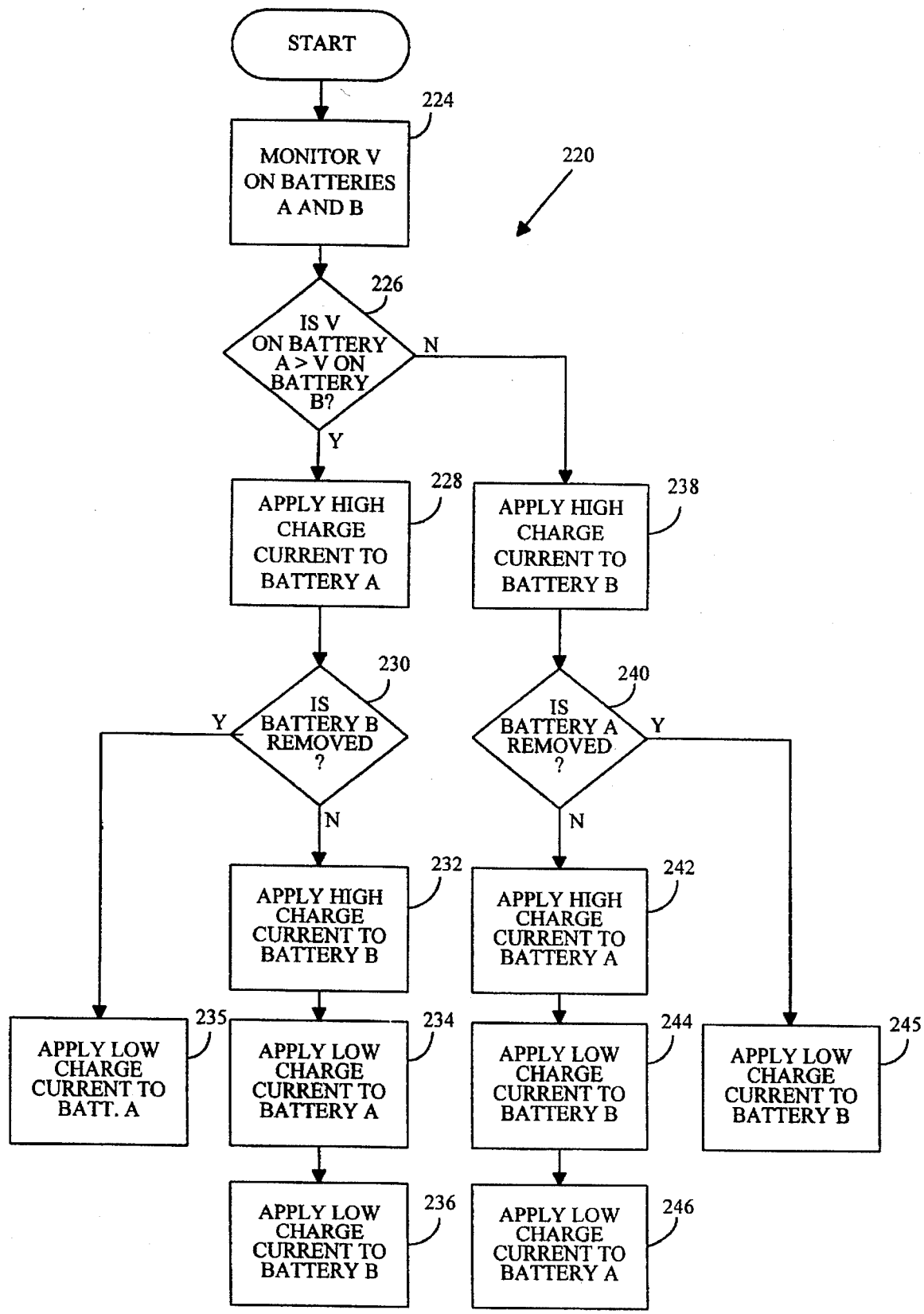
FIG. 11 is a flow chart of a method of charging multiple batteries under the present invention.

As discussed above with respect to FIG. 4, when the power switch 146 is turned off (i.e., not on), the microprocessor 102 recharges the batteries A and B, if necessary, in a routine 220 and indicates the charging condition of each battery in a routine 222. As shown in FIG. 11, the microprocessor 102 begins the routine 220 by monitoring the voltage on both the batteries A and B in a step 224 and determines if the battery A has a voltage greater than battery B in a step 226. If battery A does have a greater voltage than battery B, then in step 226, the microprocessor provides the high charge enable signal to the high current enable circuit 128 at the node D. The high current enable circuit 128 in response thereto outputs the high current drive signal to the high current drive circuit 132 enabling the high current drive circuit 132 to output the high charge current to the battery switching circuit 134. The microprocessor 102 also outputs the battery A switching signal to the battery switching circuit 134 to node E, enabling the battery switching circuit 134 to output the high charge current to the battery A. The high charge enable signal and high current drive signal are continuously output, and thus the high charge current is continuously applied to the battery A until the terminal voltage of the battery A rises above a threshold voltage $V_{HC}$ (preferably 15.5 volts) or a 5-hour time-out occurs, whichever occurs first. As shown in FIG. 13, the battery's voltage rises from 9 volts to approximately 15.5 volts as the high charge current of approximately 0.5 amps is applied to the battery A until time $t_1$ (approximately 5 hours).

The microprocessor 102 thereafter determines whether the battery B has been removed in a step 230. If the battery B is present, then the microprocessor 102 provides the battery B switching signal to the battery switching circuit 134 enabling the battery switching circuit 134 to output the high charge current to the battery B, in a step 232. Again, the high charge current is continuously applied to the battery B until the 5-hour time-out expires or the terminal voltage of the battery B rises above the threshold voltage $V_{HC}$.

Figure 14:
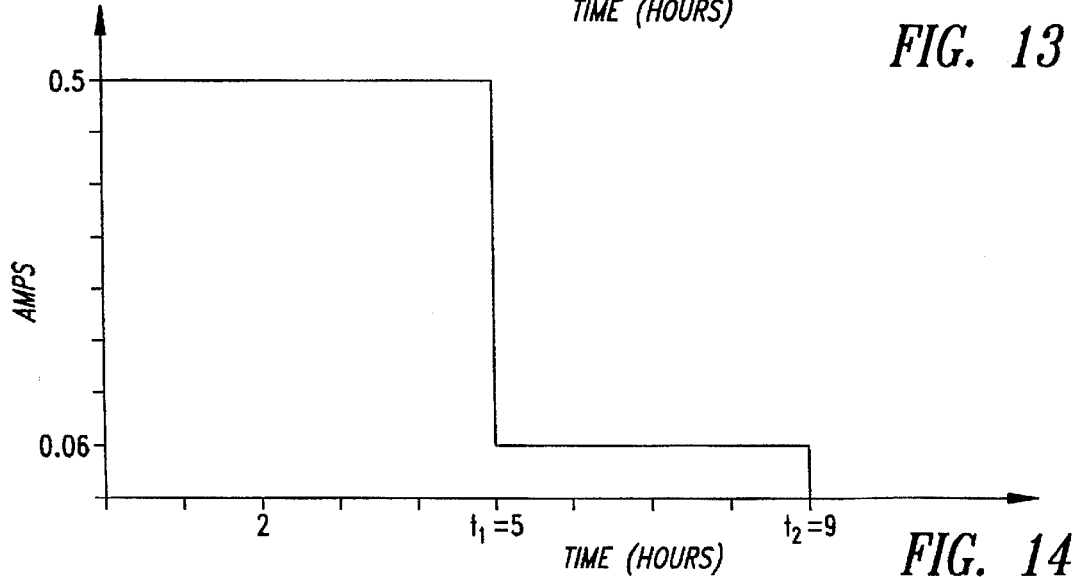
FIG. 14 is a typical graph of the current output from the charging circuit of FIG. 9.

Thereafter, the microprocessor 102 outputs the low current enable signal to the low current enable circuit 126 at the node C, in a step 234. The low current enable circuit 126 in response thereto enables the low current drive circuit 130 to output the low charge current to the battery switching circuit 134. After a 4-hour time-out expires or the terminal voltage of the battery A rises above a threshold voltage $V_{LC}$ (preferably 15.5 volts), which ever occurs first, the low current enable signal and low current drive signal are discontinued, and thus the low charge current is no longer applied to the battery A. As shown in FIG. 14, the low charge current of approximately 0.06 amps is applied to the battery A until time $t_2$ (approximately equal to 9 hours of elapsed time), whereby the voltage on the battery A rises from approximately 13 volts at $t_1$ to approximately 15.5 volts at $t_2$. Thereafter, in a step 236, the microprocessor 102 outputs the battery B switch signal to the battery switching circuit 134, enabling the battery switching circuit 134 to provide the low charge current to the battery B. As described generally herein, the low charge current (or the high charge current) is applied to a selected battery until the four-hour (or five-hour) time-out expires or the terminal voltage on the selected battery rises above the threshold voltage $V_{LC}$ (or $V_{HC}$).

If the battery B has not been removed, then the microprocessor 102 outputs the low current enable signal to the low current enable circuit 126 at the node C in a step 235. The low current enable circuit 126 in response thereto enables the low current drive circuit 130 to output the low charge current to the battery switch circuit 134 and therefore to the battery A.

If the battery A has a voltage less than the battery B, then the microprocessor 102 provides the high current enable signal to the high current enable circuit 128 at the node D, in a step 238. The high current enable circuit 128 in response thereto enables the high current drive circuit 132 to output the high charge current to the battery switching circuit 134. The microprocessor 102 in step 238 also provides the battery B switching signal to the battery switching circuit 134 at the node E, enabling the battery switching circuit 134 to provide the high charge current to the battery B. After a similar 5-hour time-out or if the terminal voltage on the battery B rises above the threshold voltage $V_{HC}$, then in a step 240, the microprocessor 102 determines whether the battery A has been removed. If the battery A has not been removed, then in a step 242, the microprocessor 102 outputs the battery A switching signal to the battery switching circuit 134 at the node E, enabling the battery switching circuit 134 to provide the high charge current to the battery A. Thereafter, in a step 244, the microprocessor 102 applies the low current enable signal to the low current enable circuit 126 at the node C. The low current enable circuit 126 in response thereto enables the low current drive circuit 130 to output the low charge current to the battery switching circuit 134. In the step 244, the microprocessor 102 applies the battery B switching signal to the node E, enabling the battery switching circuit 134 to provide the low current charge to the battery B. Thereafter, in a step 246, the microprocessor 102 applies the battery A switching signal to the node E, enabling the battery switching circuit 134 to apply the low charge current to the battery A.

If the battery A has been removed, then in a step 245, the microprocessor 102 applies the low current enable signal to the low current enable circuit 126 at the node C. The low current enable circuit 126 in response thereto enables the low current drive circuit 130 to output the low charge current to the battery switching circuit 134, and therefrom to the battery B.

The voltage at the terminals of the batteries are preferably sampled once every second during the battery charging routine 220. With a defective battery or no battery installed into one of the slots, the terminal voltage will rise above 16 volts in less than one second. Thus, even though the high or low current drive circuits 130 and 132 are disabled from providing current to the slot when the terminal voltage rises above 16 volts, the terminal voltage could rise above 16 volts within one second.

Figure 12:
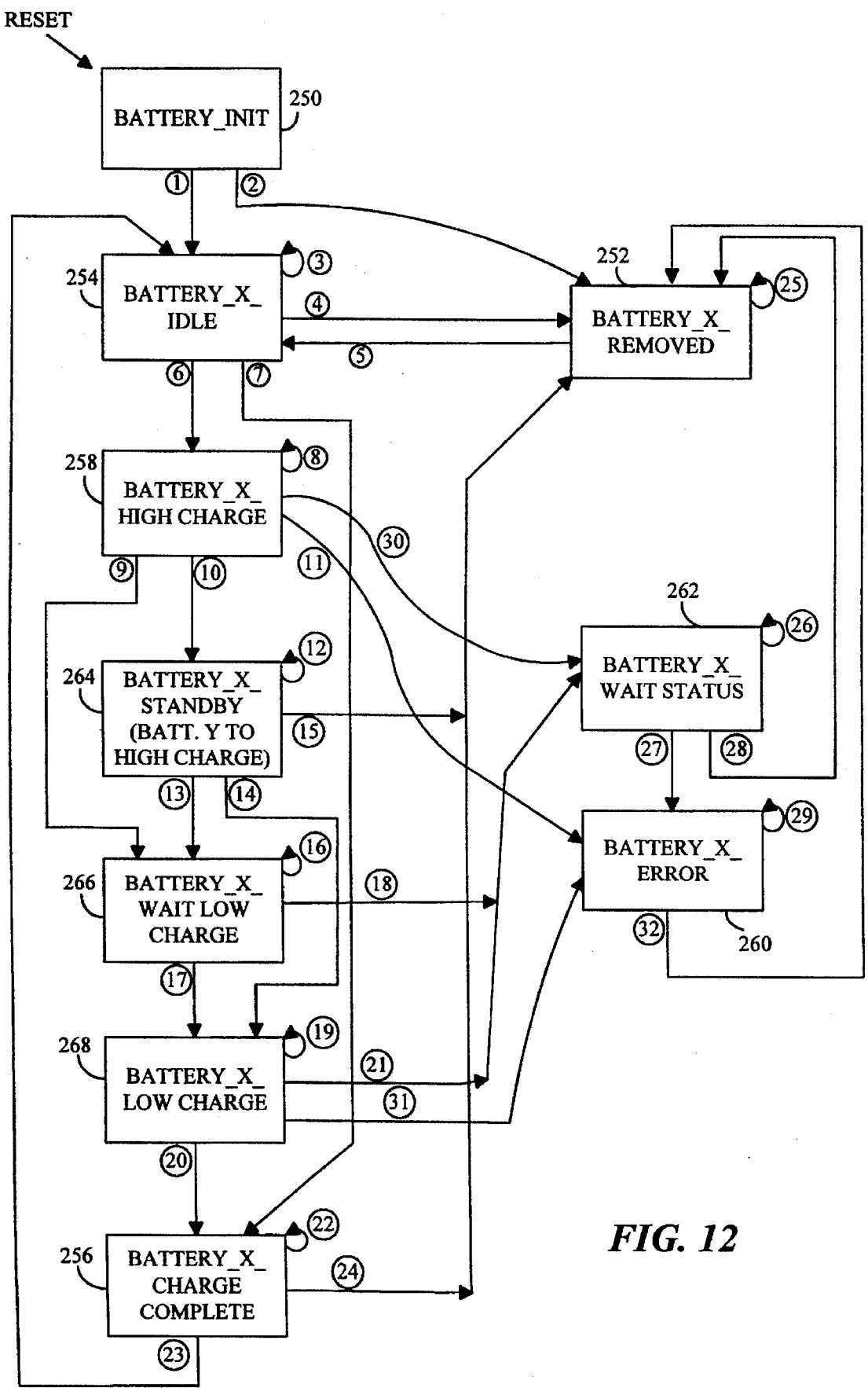
FIG. 12 is a state diagram of a method of charging multiple batteries under the present invention.

The flow chart shown in FIG. 11 provides only a broad depiction of the steps performed by the selecting/charging system 100 when it recharges the batteries A and/or B. More preferably, the microprocessor 102 continuously monitors the voltage signals from the battery voltage monitor circuit 114, and adjusts the charging of the batteries accordingly. For example, the microprocessor 102 monitors the status of the batteries to determine if any are defective or are removed during charging. A state diagram shown in FIG. 12 more accurately depicts the various states in which the batteries A and B may be, and is therefore a more accurate representation of the charging processes performed by the selecting/charging system 100. The state diagram shows the various states in which the batteries A and B may be and the transitions between these states. The states are connected by transition arrows that are labeled with encircled numbers, represented below as parenthetical numbers, e.g., "(7)". The conditions necessary for a transition from one state to another, and the various states, are described below.

A first state BATT_INIT 250 is entered on power-up of the unit 101. The terminal voltages on the batteries A and B are monitored. Shown as a transition (2), if the terminal voltage of a battery is less than 6 volts, the next state for that battery is a BATT-X_REMOVED state 252. Otherwise, shown as a transition (1), the next state for that battery is a BATT-X_IDLE state 254. The variable "X" in these and the following states indicates that either the battery A or the battery B may be in the particular state.

The BATT-X_IDLE state 254 is a holding state, where the particular battery A or B is not being charged. Shown as a transition (4), if the terminal voltage on the battery drops below 6.0 volts, then the battery is transferred to the BATT-X_REMOVED state 252. Shown as a transition (7), if the terminal voltage on the battery is greater than 13.5 volts, then the battery is transferred to a BATT-X_CHARGE_COMPLETE state 256. Otherwise, the selecting/charging system 100 compares the states of the batteries A and B. Shown as a transition (6), if battery B is also in the BATT-X_IDLE state 254, then the battery with the higher terminal voltage will be transferred into a BATT-X_HIGH_CHARGE state 258. For example, if battery A has a higher terminal voltage than battery B, battery A first receives the high charge current. Shown as a transition (3), the other battery (battery B) then remains in the BATT-X_IDLE state 254 while the selected battery (battery A) is being high charged or until one of the batteries is removed.

The BATT-X_HIGH_CHARGE state 258 is the state where the high charge current from the high current drive circuit 132 is applied to the selected battery. The battery stays in this state until its terminal voltage rises above 15.5 volts or after a 5-hour time-out expires (i.e., a 5-hour counter counts down to 0), shown as a transition (8). Shown as a transition (11), if the 5-hour time-out occurs, then the next state for that battery (battery A) is a BATT-X_ERROR state 260. If the terminal voltage on the battery A is greater than 16 volts, the battery could have been removed or the battery is defective internally. In either case, however, the battery A is transferred to a BATT-X_WAIT_STATUS state 262, shown as a transition (30). If the battery A has completed charging, i.e., its terminal voltage has risen above 15.5 volts, and the 5-hour time-out has not expired, then the state of the other battery (battery B) is interrogated. If the battery B is in the BATT-X_IDLE state 254, then the state of the battery B is changed to the BATT-X_HIGH_CHARGE state 258 and the battery A is transferred into a BATT-X_STANDBY state 264, shown as a transition (10). If battery B is not in the BATT-X_IDLE state 254, then the battery A is transferred into a BATT-X_WAIT_LOW_CHARGE state 266, shown as a transition (9).

The BATT-X_WAIT_LOW_CHARGE state 266 is a holding state after the low charge current has just been applied to a battery. As shown in FIG. 13, after the high charge current has been applied to the battery, the terminal voltage decreases rapidly and sharply, but not instantly. This holding state is a waiting period (approximately one minute) to allow the terminal voltage on the battery to settle after the high charge current has been applied to the battery, and before the terminal voltage of the battery is sampled. Shown as a transition (18), if the terminal voltage on the battery rises above 16 volts, however, the battery has been removed or is defective and the next state for the battery is the BATT-X_WAIT_STATUS state 262. Otherwise, the battery remains in the BATT-X_WAIT_LOW_CHARGE state 266 until the one-minute time-out counter expires, shown as an transition (16). Thereafter, the battery transfers to a BATT-X_LOW_CHARGE state 268, shown as a transition (17).

The BATT-X_STANDBY state 264 is a holding state after the high charge current has been applied to a battery and before the low charge current is applied to that battery while the other battery receives the high charge current. As long as the other battery, battery B in this example, is receiving the high charge current, the battery A remains in this state, shown as a transition (12). If the battery A is removed during this period, the next state is BATT-X_REMOVED 252, shown as a transition (15). If the battery B is removed and one minute has not passed since battery A has been transferred to the BATT-X_STANDBY state 264, then a one-minute time-out counter continues and controls the transition to the next state. If the time-out expires, then the next state for the battery A is the BATT-X_LOW_CHARGE state 268, shown as a transition (14).

The BATT-X_LOW_CHARGE state 268 is the state where the low charge current is applied to the battery and the terminal voltage of the battery is monitored. There is a time-out of approximately four hours in this state, shown as a transition (19). If the terminal voltage rapidly rises above 16 volts, then the next state is the BATT-X_WAIT_STATUS state 262, shown as a transition (21). If the four-hour time-out counter expires and the terminal voltage is still below 13.5 volts, then the next state is the BATT-X_ERROR state 260, shown as a transition (31). When the terminal voltage rises above 15.5 volts, but is less than 16 volts, the low charge state is complete and the next state is the BATT-X_CHARGE_COMPLETE state 256, shown as the transition (20).

The BATT-X_CHARGE_COMPLETE state 256 is a holding state for a fully recharged battery indicated by a terminal voltage of greater than 13.5 volts, shown as a transition (22). The battery is not being charged in this state. As shown in FIG. 13, the batteries A and B settle to a terminal voltage of approximately 13.5 volts after being completely charged. If the terminal voltage for the battery drops below 13.5 volts, but is greater than 6 volts, then the next state is the BATT-X_IDLE state 254, shown as a transition (23). If the terminal voltage for the battery drops below 6 volts, then the next state is the BATT-X_REMOVED state 252, shown as a transition (24).

The BATT-X_REMOVED state 252 is a holding state for a battery slot that has no battery installed therein. The selecting/charging system 100 remains in this state while the terminal voltage is less than 6 volts, shown as a transition (25). Otherwise, the system 100 transfers to the BATT-X_IDLE state 254, shown as a transition (5). The battery charging circuit 112 does not apply to any charge to the particular slot in this state 252.

The BATT-X_WAIT_STATUS state 262 is an intermediate state to differentiate between a removed battery and an internally defective battery. If a current charge is provided to an empty battery slot, the terminal voltage measured at this slot is greater than 16 volts because it is an open circuit. Defective batteries may also rise above 16 volts in a very short time. Therefore, to differentiate therebetween, the battery charging circuit 112 is turned off (i.e., no charge current is applied to the terminals of the slot). If a battery is in the slot, then the terminal voltage in the particular battery slot remains above 6 volts, because some amount of current (actually noise in the unit 101) is being transmitted through the battery and an open circuit does not exist. The next state is thus the BATT-X_ERROR state 260, shown as a transition (27). Otherwise, the next state is the BATT-X_REMOVED state 252, shown as the transition (28).

The BATT-X_ERROR state 260 is a holding state whereby the battery charging circuit 112 is not coupled to the particular slot such that no high or low charge currents are provided thereto. Once a battery has been determined to be internally defective, the battery stays in this state until the battery is removed or the power is turned off by the switch 146, shown as the transition (32).

As shown in FIG. 6, the battery selecting/charging system 100 also indicates the charging condition of the batteries A and B in the routine 222, by means of the visual indicator/display 105 (shown in FIG. 2). To indicate the charging condition of the batteries A and B, the visual indicator/display 105 preferably includes a single LED positioned adjacent to each battery slot A and B. The following table indicates the status of the LED and the corresponding status of the battery reflected by this LED. The microprocessor 102 outputs an appropriate signal to the LED to indicate the desired status.

TABLE 4

Visual Indication of Battery Charging Status

| LED is | Status of battery |
|---|---|
| OFF | This battery is not present or the battery charger is off. |
| Flashing 1 Hz rate 50% duty cycle | This battery is actively being charged. |
| Flashing ⅓ Hz rate 16% duty cycle | This battery is waiting its turn to be charged. |
| Flashing 2 Hz rate 50% duty cycle | This battery could not be charged properly. It may be defective. |
| ON steady | This battery is fully charged. |

The present invention describes the battery selecting/charging system 100 which includes the battery charging circuit 112 and the battery selection circuit 110 together in the portable electronic unit 101. The two circuits do not interfere with each other, rather, they compliment each other by minimizing the amount of circuitry required for the battery selecting/charging system 100. For example, the battery voltage monitoring circuit 114 and the microprocessor 102 are each required by these circuits. Redundant circuitry is thereby eliminated.

The present invention provides a reliable portable electronic device using two or more rechargeable batteries which provide continuous power to the device, without any delays, and which charges the batteries without relying on the operator's memory or diligence in carrying additional batteries or recharging depleted ones. When the device is powered up, the battery charging/selecting system of the present invention selects one battery to power the device until it is depleted and then automatically switches to the second battery. When the second battery is depleted, both batteries are selected to power the device so as to provide any remaining charge thereto.

When the device is powered down, the system automatically and quickly recharges the batteries up to their full capacity, without damaging them. The recharging circuit provides the greatest amount of charge in the shortest period of time to attempt to provide at least one nearly fully charged battery for the device in as short a period of time as possible. The operator of the device need not carry additional batteries if the device has been provided a minimal amount of time to recharge.

Although specific embodiments of the invention have been described for purposes of illustration, various modifications may be made without departing from the spirit and scope of the invention, as is known by those skilled in the relevant art. For example, as used generally herein, "batteries" refer to electrical charge storage devices. However, other energy storage devices may be used, and the system may be modified by those skilled in the relevant art based on the detailed description provided herein to select and charge these alternative storage devices. Accordingly, the invention is not limited by the disclosure, but instead its scope is to be determined entirely by reference to the following claims.

We claim:

1. A battery charging and selecting system coupled to a terminal of a voltage supply for charging at least first and second batteries and for selecting at least one of at least first and second batteries to deliver power to an electrical component, the first and second batteries having respective first and second voltages, the system comprising:

a battery charger coupled to the terminal of the voltage supply and selectively coupled to the first and second batteries, the battery charger selectively providing a first mount of current to the first and second batteries;

a battery selector for selectively coupling the first and second batteries to the electrical component, the battery selector having a first state that couples at least one of the first and second batteries to the electrical component to supply power thereto and a second state that uncouples both of the first and second batteries from the electrical component;

a battery voltage monitoring circuit coupled to the first and second batteries and outputting first and second voltage signals representing the first and second voltages, respectively; and a control circuit coupled to the battery charger, the battery selector and the battery voltage monitoring circuit, the control circuit determining in which state the battery selector is, and, if the battery selector is in the first state, then the control circuit (i) directs the battery selector to couple the first battery to the electrical component, (ii) compares the first voltage signal to a threshold voltage value, (iii) directs the battery selector to couple the second battery to the electrical component when the first voltage signal is less than the threshold voltage value, (iv) compares the second voltage signal to the threshold voltage value, and (v) directs the battery selector to couple both of the first and second batteries to the electrical component when the second voltage signal is less than the threshold voltage value, and if the battery selector is in the second state, the control circuit then
(i) compares the first and second voltage signals before the battery charger provides the first amount of current to either one of the first and second batteries,
(ii) determines that the first voltage signal corresponding to the first voltage on the first battery is greater than the second voltage signal corresponding to the second voltage on the second battery,
(iii) causes the battery charger to provide the first amount of current to the first battery, and
(iv) thereafter causes the battery charger to provide the first amount of current to the second battery.

2. The battery charging and selecting system of claim 1 wherein the control circuit selectively outputs first and second selecting signals, wherein the battery selector includes a first battery selecting circuit coupled to the first battery, the electrical component and the control circuit, and a second battery selecting circuit coupled to the second battery, the electrical component, and the control circuit, and wherein the first and second battery selecting circuits couple the first and second batteries to the electrical component in response to the first and second selecting signals, all respectively.

3. The battery charging and selecting system of claim 1 wherein the battery charger includes first and second charging circuits coupled to the terminal of the voltage supply and selectively coupled to the first and second batteries, the first and second charging circuits selectively providing the first and a second amounts of current, respectively, to the first and second batteries, the second amount of current being less than the first amount of current, and wherein if the battery selector is in the second state, the control circuit (v) causes the second charging circuit to provide the second amount of current to the first battery, and (vi) thereafter causes the second charging circuit to provide the second amount of current to the second battery.

4. The battery charging and selecting system of claim 3 wherein the control circuit selectively outputs first and second battery switching signals, the system further comprising a battery switching circuit coupled to the control circuit, the first and second charging circuits and to the first and second batteries, the battery switching circuit causing one of the first and second amounts of currents to be provided to the first battery in response to the first battery switching signal, and causing one of the first and second amounts of currents to be provided to the second battery in response to the second battery switching signal.

5. A method of controlling a battery charging and selecting system, the system having a battery selector having first and second states, the method comprising:
selecting at least one of at least first and second batteries to deliver power to an electrical component when the battery selector is in the first state by:
selecting the first battery to deliver power to the electrical component;
comparing the voltage output of the first battery to a first threshold voltage value;
selecting the second battery to power the electrical component if the output voltage of the first battery is less than the first threshold voltage value;
comparing the voltage output of the second battery to the first threshold voltage value; and
selecting both of the first and second batteries to supply power to the electrical component if the voltage output of the second battery is less than the first threshold voltage value; and charging at least the first and second batteries when the battery selector is in the second state by:
comparing the output voltages of the first and second batteries before charging either one of the first and second batteries; and
if the output voltage of the first battery is greater than the output voltage of the second battery, charging the first battery with a first amount of current; and thereafter charging the second battery with the first amount of current.

6. The method of claim 5, further comprising:
charging the first battery with a second amount of current; and
thereafter charging the second battery with the second amount of current, the second amount of current being less than the first amount of current.

7. The method of claim 5, further comprising:
monitoring the output voltages of the first and second batteries as the first and second batteries are being charged; and
selectively discontinuing the charging of the first and second batteries when the output voltages of the first and second batteries exceed a second threshold value.

8. The method of claim 7, wherein the second threshold value is approximately equivalent to a voltage monitored on a defective battery, the method further comprising providing a first indication if one of the first and second batteries exceeds the second threshold value.

9. The method of claim 5, wherein charging the second battery thereafter includes determining whether the second battery is present, and thereafter charging the second battery only if the second battery is present.

10. The method of claim 5, further comprising:
monitoring the output voltages of the first and second batteries;
determining whether the output voltages of both the first and second batteries are below a third threshold value;
determining whether the output voltages of both the first and second batteries are below a fourth threshold value if the output voltages of both the first and second batteries are below the third threshold value;
providing a second indication if the output voltages of both the first and second batteries are below the fourth threshold value;
determining whether the output voltage of one of the first and second batteries is below the fourth threshold value if the output voltages of both the first and second batteries are below the third threshold value; and
providing a first indication if the output voltage of one of the first and second batteries is below the fourth threshold value.

11. The method of claim 10, further comprising:
determining whether the output voltage of one of the first and second batteries is below a fifth threshold voltage;
determining whether the fifth threshold voltage is greater than a sixth threshold voltage if the output voltage of one of the first and second batteries is below the fifth threshold voltage; and
decreasing the fifth threshold voltage to a seventh threshold voltage if the fifth threshold voltage is greater than the sixth threshold voltage.

12. The method of claim 11, further comprising the steps of:

determining whether the fifth threshold voltage is equal to the sixth threshold voltage if the output voltage of one of the first and second batteries is above the fifth threshold voltage; and setting the fifth threshold voltage to the seventh threshold voltage if the fifth threshold voltage is equal to the sixth threshold voltage.

\* \* \* \* \*

UNITED STATES PATENT AND TRADEMARK OFFICE
CERTIFICATE OF CORRECTION

PATENT NO. : 5,640,078
DATED : June 17, 1997
INVENTOR(S) : A.H. Kou et al.

It is certified that error appears in the above-indentified patent and that said Letters Patent is hereby corrected as shown below:

| COLUMN | LINE | |
|---|---|---|
| Title Page, item[56] | Foreign Pat. Docs. (Item 3) | Before "39 26 655" insert --DE-- |
| 18 (Claim 1, | 41 line 10) | "mount" should read --amount-- |

Signed and Sealed this

Twenty-fifth Day of November, 1997

Attest:

BRUCE LEHMAN

Attesting Officer

Commissioner of Patents and Trademarks